US009830619B2

(12) United States Patent
Lee et al.

(10) Patent No.: US 9,830,619 B2
(45) Date of Patent: Nov. 28, 2017

(54) METHOD FOR SEARCHING FOR OR ADVERTISING SERVICE IN DIRECT COMMUNICATION SYSTEM AND DEVICE FOR SAME

(71) Applicant: LG ELECTRONICS INC., Seoul (KR)

(72) Inventors: Wookbong Lee, Anyang-si (KR); Byungjoo Lee, Anyang-si (KR); Dongcheol Kim, Anyang-si (KR); Hangyu Cho, Anyang-si (KR); Jinho Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/417,056

(22) PCT Filed: Nov. 5, 2013

(86) PCT No.: PCT/KR2013/009934
§ 371 (c)(1),
(2) Date: Jan. 23, 2015

(87) PCT Pub. No.: WO2014/069965
PCT Pub. Date: May 8, 2014

(65) Prior Publication Data
US 2015/0206190 A1 Jul. 23, 2015

Related U.S. Application Data

(60) Provisional application No. 61/722,244, filed on Nov. 5, 2012, provisional application No. 61/722,793, filed (Continued)

(51) Int. Cl.
*H04W 48/16* (2009.01)
*G06Q 30/02* (2012.01)
(Continued)

(52) U.S. Cl.
CPC ..... *G06Q 30/0267* (2013.01); *G06Q 30/0277* (2013.01); *H04L 67/16* (2013.01);
(Continued)

(58) Field of Classification Search
None
See application file for complete search history.

(56) References Cited

U.S. PATENT DOCUMENTS

2007/0141988 A1* 6/2007 Kuehnel ............... H04W 8/005
455/41.2
2008/0010372 A1* 1/2008 Khedouri .......... G06F 17/30094
709/224

(Continued)

FOREIGN PATENT DOCUMENTS

KR 10-2012-0045628 5/2012
KR 10-2012-0073150 7/2012
(Continued)

OTHER PUBLICATIONS

PCT International Application No. PCT/KR2013/009934, Written Opinion of the International Searching Authority dated Jan. 29, 2014, 17 pages.
(Continued)

*Primary Examiner* — Alejandro Rivero
(74) *Attorney, Agent, or Firm* — Lee Hong Degerman Kang & Waimey

(57) ABSTRACT

The present invention relates to a wireless communication system, and a method for searching for or advertising a service and a device for the same. A method for searching for a service, according to one embodiment of the present invention, can comprise: transmitting a probe request frame to search for a device supporting a predetermined service desired by a first wireless device; receiving a probe response frame from a second wireless device supporting the predetermined service; transmitting, by the first wireless device, a service search request frame including a service name of the predetermined service to the second wireless device; and
(Continued)

receiving a service search response frame from the second wireless device, wherein the service search response frame can include service status information indicating whether the predetermined service is available on the second wireless device.

8 Claims, 15 Drawing Sheets

Related U.S. Application Data on Nov. 6, 2012, provisional application No. 61/729,635, filed on Nov. 26, 2012, provisional application No. 61/732,866, filed on Dec. 3, 2012, provisional application No. 61/736,490, filed on Dec. 12, 2012.

(51) Int. Cl.
H04L 29/08 (2006.01)
H04W 92/18 (2009.01)
H04W 76/02 (2009.01)
H04W 84/12 (2009.01)

(52) U.S. Cl.
CPC .......... *H04W 48/16* (2013.01); *H04W 76/023* (2013.01); *H04W 84/12* (2013.01); *H04W 92/18* (2013.01)

(56) References Cited

U.S. PATENT DOCUMENTS

| | | | |
|---|---|---|---|
| 2009/0239469 A1* | 9/2009 | Rangarajan | H04L 67/16 455/41.2 |
| 2010/0235525 A1* | 9/2010 | McGuire | H04L 61/1511 709/228 |
| 2011/0149806 A1 | 6/2011 | Verma et al. | |
| 2011/0216748 A1 | 9/2011 | Kawase | |
| 2011/0281557 A1 | 11/2011 | Choi et al. | |
| 2012/0134349 A1 | 5/2012 | Jung et al. | |
| 2012/0243524 A1 | 9/2012 | Verma et al. | |
| 2014/0016507 A1* | 1/2014 | Han | H04W 28/18 370/254 |
| 2014/0016628 A1* | 1/2014 | McCann | H04W 4/001 370/338 |

FOREIGN PATENT DOCUMENTS

| | | |
|---|---|---|
| KR | 10-2012-0082846 | 7/2012 |
| KR | 10-2012-0095572 | 8/2012 |
| RU | 2179373 | 2/2002 |
| RU | 2347327 | 2/2009 |
| WO | 2012060611 | 5/2012 |

OTHER PUBLICATIONS

PCT International Application No. PCT/KR2013/009934, Written Opinion of the International Searching Authority dated Jan. 29, 2014, 12 pages.

IP Australia Application No. 2013338811, Office Action dated Feb. 29, 2016, 5 pages.

Wi-Fi Alliance Technical Committee P2P Task Group, "Wi-Fi Peer-to-Peer (P2P) Technical Specification", Version 1.2, Dec. 14, 2011, 159 pages.

European Patent Office Application No. 13851846.9, Search Report dated Mar. 1, 2016, 11 pages.

Russian Patent Office Application No. 2015111490, Search Report dated Jul. 4, 2017, 16 pages.

* cited by examiner (a)

invitation of B from A (b)

● group owner  ◎ group client  ⊜ no group (a)

association of A with B (b)

● group owner  ◎ group client  —✕— link termination (a)

association of A with B (b)

● group owner  ◎ group client  ⊜ no group (a)

association of A with B (b)

● group owner  ◎ group client  —✕— link termination

| OUI subtype | service update indicator | length | service protocol type | service transaction ID | query data |
|---|---|---|---|---|---|

Octets    1        2        2        1        1        variable

| OUI subtype | service update indicator | length | service protocol type | service transaction ID | status code | response data |
|---|---|---|---|---|---|---|

Octets    1        2        2        1        1        1        variable

METHOD FOR SEARCHING FOR OR ADVERTISING SERVICE IN DIRECT COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2013/009934, filed on Nov. 5, 2013, which claims the benefit of U.S. Provisional Application Ser. Nos. 61/722,244, filed on Nov. 5, 2012, 61/722,793, filed on Nov. 6, 2012, 61/729,635, filed on Nov. 26, 2012, 61/732,866, filed on Dec. 3, 2012 and 61/736,490, filed on Dec. 12, 2012, the contents of which are all hereby incorporated by reference herein in their entirety.

TECHNICAL FIELD

The present invention relates to a wireless communication system, and more particularly, to a method for searching for or advertising a service in a direct communication system and a device for the same.

BACKGROUND ART

Recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

As direct communication technology that may allow devices to be easily connected with each other without a radio access point (AP) basically required in a conventional WLAN system, the introduction of Wi-Fi Direct or Wi-Fi peer-to-peer (P2P) has been discussed. According to Wi-Fi Direct, devices may be connected to each other even without a complicated establishment procedure. Also, Wi-Fi Direct may support a mutual operation for data transmission and reception at a communication speed of a general WLAN system to provide users with various services.

Recently, various Wi-Fi support devices have been used. Of the Wi-Fi support devices, the number of Wi-Fi Direct support devices that enable communication between Wi-Fi devices without AP has been increased. In Wi-Fi Alliance (WFA), technology for the introduction of a platform for supporting various services (for example, Send, Play, Display, Print, etc.) using Wi-Fi Direct link has been discussed. This may be referred to as Wi-Fi Direct Service (WFDS). According to the WFDS, applications, services, etc. may be controlled or managed by a service platform called an application service platform (ASP).

DISCLOSURE

Technical Problem

An object of the present invention is to provide a method for searching for or advertising a service in a WFDS system. More particularly, an object of the present invention is to provide a method for controlling or managing an ASP of a WFDS device for service search or advertisement.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problem, according to one embodiment of the present invention, a method for searching for service in a first wireless device, which supports Wi-Fi Direct service, comprises transmitting a probe request frame to search for a device supporting a predetermined service desired by the first wireless device; receiving a probe response frame from a second wireless device supporting the predetermined service; transmitting a service search request frame, which includes a first service name of the predetermined service, from the first wireless device to the second wireless device; and receiving a service search response frame from the second wireless device, wherein the service search response frame includes service status information indicating whether the predetermined service is available on the second wireless device.

To solve the aforementioned technical problem, according to another embodiment of the present invention, a method for advertising service in a first wireless device, which supports Wi-Fi Direct service, comprises receiving a probe request frame querying whether a predetermined service desired to sought by the second wireless device is supported, from the second wireless device; transmitting a probe response frame to the second wireless device if the predetermined service is supported; receiving a service search request frame, which includes a first service name of the predetermined service, from the second wireless device; and transmitting a service search response frame to the second wireless device, wherein the service search response frame includes service status information indicating whether the predetermined service is available on the first wireless device.

To solve the aforementioned technical problem, according to still another embodiment of the present invention, a first wireless device which supports Wi-Fi Direct service and searching for service comprises a transceiver; and a processor.

The processor controls the transceiver to transmit a probe request frame for searching for a device supporting a predetermined service desired by the first wireless device, and if the transceiver receives a probe response frame from the second wireless device that supports the predetermined service, the processor is set to control the transceiver to transmit a service search request frame, which includes a first service name of the predetermined service, to the second wireless device, and receive a service search response frame from the second wireless device in response to the service search request frame.

To solve the aforementioned technical problem, according to further still another embodiment of the present invention, a first wireless device which supports Wi-Fi Direct service and advertising service comprises a transceiver; and a processor, wherein, if the transceiver receives a probe request frame querying whether a predetermined service desired to sought by the second wireless device is supported, from the second wireless device, the processor controls the transceiver to transmit a probe response frame in response to the probe request frame, and if the transceiver receives a service search request frame, which includes a first service name for the predetermined service from the second wireless device, the processor controls the transceiver to transmit a service search response frame to the second wireless device.

In the embodiments according to the present invention, the service search response frame includes service status information indicating whether the predetermined service is available on the first wireless device or the second wireless device.

The aforementioned embodiments and the following detailed description of the present invention are only exemplary, and are intended for additional description of the present invention cited in claims.

Advantageous Effects

According to the present invention, a method and device for searching for or advertising a service in a WFDS system may be provided. In more detail, in the present invention, a method for controlling or managing an APS of a WFDS device for service search or advertisement may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

Structure of WLAN System

Figure 1:
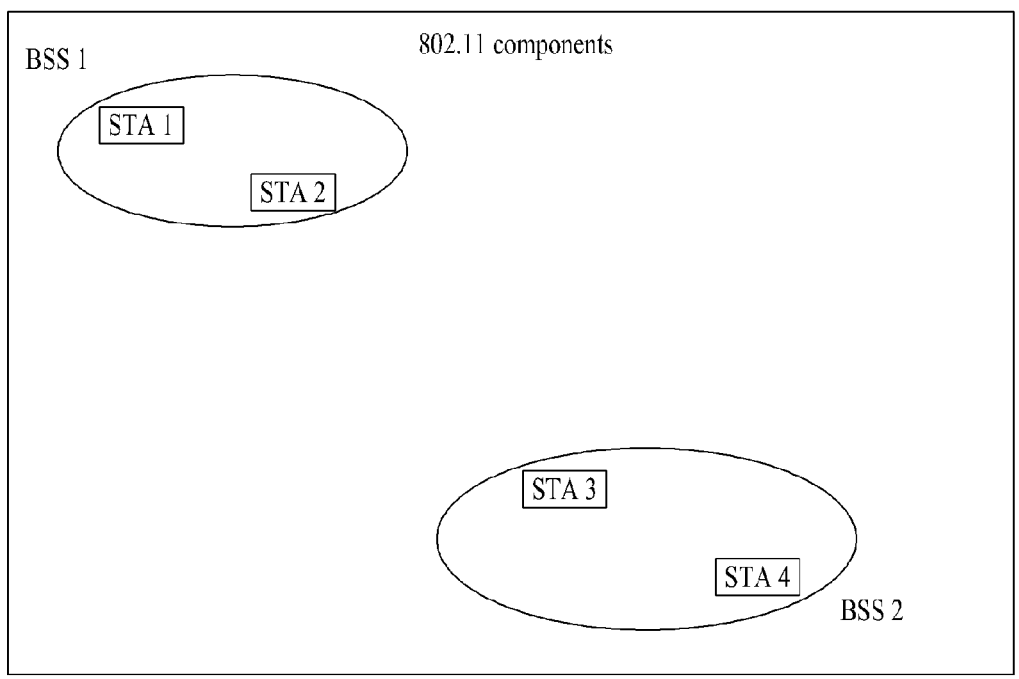
FIG. 1 is a diagram illustrating an exemplary structure of an IEEE 802.11 system to which the present invention may be applied.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Layer Structure

The operation of the STA which is operated in the wireless LAN system may be described in view of layer structure. In aspect of device configuration, layer structure may be implemented by a processor. The STA may have a structure of a plurality of layers. For example, a layer structure handled by the 802.11 standard document mainly includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptionally include management entities called MAC sublayer management entity (MLME) and physical layer management entity (PLME), respectively. These entities provide a layer management service interface that operates a layer management function.

In order to provide exact MAC operation, an SME (Station Management Entity) is present within each STA. The SME is a layer independent entity that may be viewed as residing in a separate management plane or as residing "off to the side." The exact functions of the SME are not specified in this document, but in general this entity may be viewed as being responsible for such functions as the gathering of layer-dependent status from the various layer management entities (LMEs), and similarly setting the value of layer-specific parameters. The SME may perform such functions on behalf of general system management entities and may implement standard management protocols.

The aforementioned entities interact in various ways. For example, the entities may interact by exchanging GET/SET primitives. The primitive means a set of elements or parameters related to a specific object. XX-GET.request primitive is used for requesting the value of the given MIB attribute (management information base attribute). XX-GET.confirm primitive is used for returning the appropriate MIB attribute value if status is "success," otherwise returning an error indication in the Status field. XX-SET.request primitive is used for requesting that the indicated MIB attribute be set to the given value. If this MIB attribute implies a specific action, this requests that the action be performed. And, XX-SET.confirm primitive is used such that, if status is "success," this confirms that the indicated MIB attribute has been set to the requested value, otherwise it returns an error condition in the status field. If this MIB attribute implies a specific action, this confirms that the action has been performed.

Also, the MLME and the SME may exchange various MLME_GET/SET primitives through MLME_SAP (Service Access Point). Also, various PLME_GET/SET primitives may be exchanged between PLME and SME through PLME_SAP, and may be exchanged between the MLME and PLME through MLME-PLME_SAP.

Evolution of Wireless LAN

Standards for Wireless Local Area Network (WLAN) technology have been developed by Institute of Electrical and Electronics Engineers (IEEE) 802.11 group. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transmission rate of 300 Mbps. IEEE 802.11n may support a channel bandwidth up to 40 MHz to provide a transmission rate of 600 Mbps.

A direct link setup (DLS) related protocol under the environment according to IEEE 802.11e is based on QBSS (Quality BSS (basic service set)) that BSS supports QoS (Quality of Service). In QBSS, AP as well as non-AP STA is a QAP (Quality AP) that supports QoS. However, under the WLAN environment (for example, WLAN environment according to IEEE 802.11a/b/g) which is currently commercialized, although the non-AP STA is a QSTA (Quality STA) that supports QoS, the AP is likely to be a legacy AP that fails to support QoS. As a result, there is a limitation that DLS service cannot be used even in case of the QSTA under the WLAN environment which is currently commercialized.

Tunneled direct link setup (TDLS) is a wireless communication protocol which is newly suggested to solve such a limitation. TDLS, although not supporting QoS, enables QSTAs to set a direct link even under the WLAN environment such as IEEE 802.11a/b/g which is currently commercialized and set a direct link even in case of a power save mode (PSM). Accordingly, TDLS prescribes all the procedures for enabling QSTAs to set a direct link even at BSS managed by the legacy AP. Hereinafter, a wireless network that supports TDLS will be referred to as a TDLS wireless network.

Wi-Fi Direct Network

The WLAN according to the related art has mainly handled the operation of an infrastructure BSS that a radio access point (AP) functions as a hub. The AP performs a physical layer support function for wireless/wire connection, a routing function for devices on the network, and service provision for adding/removing a device to/from the network. In this case, devices within the network are not directly connected with each other but connected with each other through the AP.

As technology for supporting direct connection between devices, enactment of Wi-Fi Direct standard has been discussed.

Figure 2:
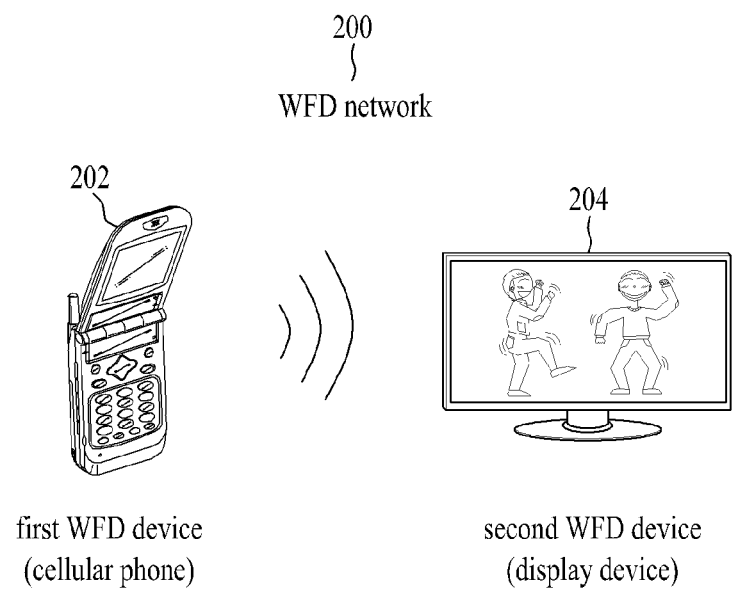
FIG. 2 is a diagram illustrating a WFD (Wi-Fi Direct) network.

FIG. 2 is a diagram illustrating a WFD (Wi-Fi Direct) network. The WFD network is a network that enables Wi-Fi devices to perform device-to-device (D2D) (or peer-to-peer (P2P)) communication even without association with a home network, office network and hot spot network, and has been suggested by Wi-Fi Alliance. Hereinafter, WFD based communication will be referred to as WFD D2D communication (simply D2D communication) or WFD P2P communication (simply, P2P communication). Also, a device that performs WFD P2P will be referred to as WFD P2P device, simply referred to as P2P device or Peer device.

Referring to FIG. 2, the WFD network 200 may include at least one Wi-Fi device that includes a first P2P device 202 and a second P2P device 204. The P2P device may include Wi-Fi supporting devices, for example, a display device, a printer, a digital camera, a projector, a smart phone, etc. In addition, the P2P device may include a non-AP STA and an AP STA. In this example, the first P2P device 202 is a smart phone, and the second P2P device 204 is a display device. The P2P devices of the WFD network may directly be interconnected. In more detail, P2P communication may mean that a signal transmission path between two P2P devices is directly configured in the corresponding P2P devices without passing through a third device (e.g., AP) or a legacy network (e.g., a network accessed to WLAN through an AP). In this case, a signal transmission path directly configured between two P2P devices may be limited to a data transmission path. For example, P2P communication may mean that a plurality of non-STAs transmit data (e.g., voice, image, text information, etc.) without passing through the AP. A signal transmission path for control information (e.g., resource allocation information for P2P configuration, wireless device identification information, etc.) may directly be configured between P2P devices (e.g., non-AP STA to non-AP STA, non-AP STA to AP), may be configured between two P2P devices (e.g., non-AP to non-AP STA) through the AP, or may be configured between the AP and the corresponding P2P device (e.g., AP to non-AP STA #1, AP to non-AP STA #2).

Figure 3:
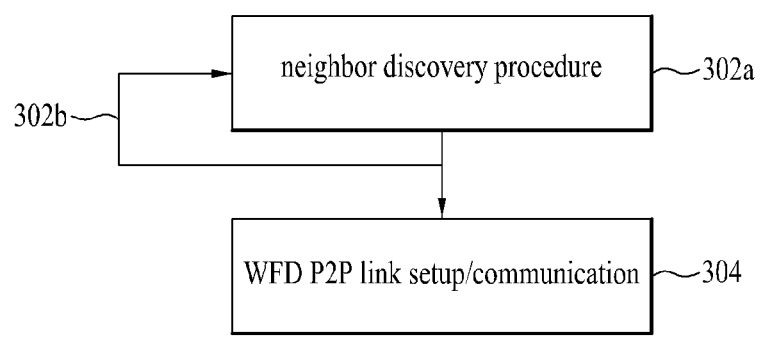
FIG. 3 is a diagram illustrating a procedure of configuring a WFD network.

FIG. 3 is a diagram illustrating a method for configuring a WFD network.

Referring to FIG. 3, the WFD network setup procedure may be largely classified into two procedures. The first procedure is a neighbor discovery (ND) procedure (S302a), and the second procedure is a P2P link configuration and communication procedure (S304). Through the neighbor discovery procedure, the P2P device (e.g., 202 of FIG. 2) searches for another neighbor P2P device (e.g., 204 of FIG. 2) within (its own radio) coverage, and may obtain information required for association (e.g., pre-association) with the corresponding P2P device. In this case, the pre-association may mean a second layer pre-association in a radio protocol. For example, information required for the pre-association may include identification information of the neighbor P2P device. The neighbor discovery procedure may be carried out per available radio channel (S302b). Afterwards, the P2P device 202 may perform WFD P2P link configuration/communication with another P2P device 204. For example, after the P2P device 202 is associated with a peripheral P2P device 204, the P2P device 202 may determine whether the corresponding P2P device 204 is a P2P device incapable of satisfying service requirements of a user. To this end, after the P2P device 202 is second layer pre-associated with the peripheral P2P device 204, the P2P device 202 may search for the corresponding P2P device 204. If the corresponding P2P device 204 does not satisfy service requirements of the user, the P2P device 202 may sever the second layer association configured for the corresponding P2P device 204, and may configure the second layer association with another P2P device. By contrast, if the corresponding P2P device 204 satisfies the service requirements of the user, the two P2P devices 202 and 204 may transmit and receive signals through a P2P link.

Figure 4:
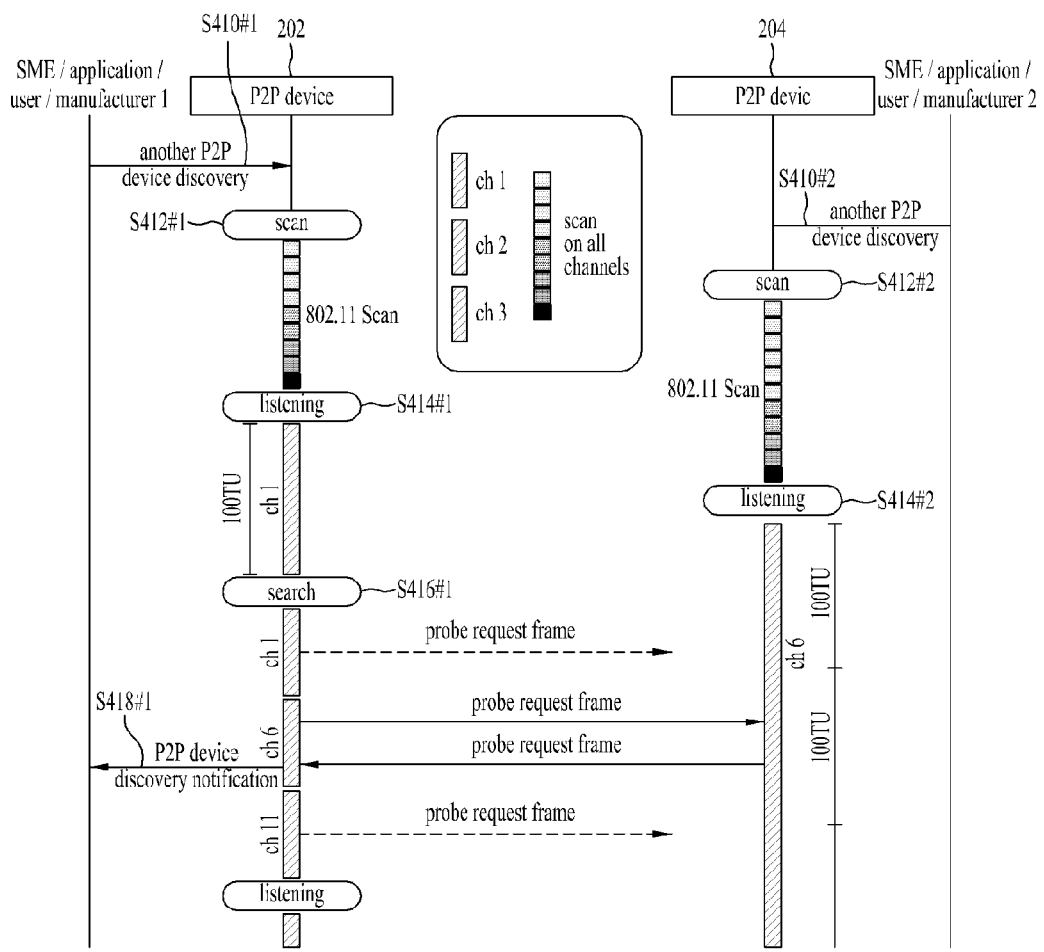
FIG. 4 is a diagram illustrating a neighboring discovery procedure.

FIG. 4 is a diagram illustrating a neighboring discovery procedure. The example of FIG. 4 may be understood as an operation between the P2P device 202 and the P2P device 204 shown in FIG. 3.

Referring to FIG. 4, the neighbor discovery procedure of FIG. 3 may be initiated by indication of station management entity (SME)/application/user/vendor (S410), and may be classified into a scanning step S412 and finding steps S414 to S416. The scanning step S412 may include the operation for scanning all available RF channels according to 802.11 schemes. Through the above-mentioned operation, the P2P device may confirm the best operation channel. The finding steps S414 to S416 may include a listening mode S414 and a search mode S416. The P2P device may alternately repeat the listening mode S414 and the search mode S416. The P2P devices 202 and 204 may perform active search by using a probe request frame in the search mode S416. For rapid search, the search range may be limited to social channels denoted by Channels #1, #6, #11 (2412, 2437, 2462 MHz). In addition, the P2P devices 202 and 204 may select only one channel from three social channels in the listening mode S414, and maintain a reception status. In this case, if the other P2P device (e.g., 202) receives the probe request frame transmitted in the search mode, the P2P device (e.g., 204) generates a probe response frame in response to the received probe request frame. A time of the listening mode S414 may be given at random (e.g., 100, 200, 300 time unit (TU)). The P2P devices continuously repeat the search mode and the reception mode so that they may reach a common channel. After the P2P device discovers another P2P device, the P2P device may discover/exchange a device type, a manufacturer, or a familiar device name by using the probe request frame and the probe response frame such that the P2P device may selectively be coupled to the corresponding P2P device. If the P2P device discovers the peripheral P2P device and obtains necessary information through the neighbor discovery procedure, the P2P device (e.g., 202) may notify SME/application/user/vendor of the P2P device discovery (S418).

Presently, P2P may be mainly used for semi-static communication such as remote printing, photo sharing, etc. However, due to generalization of Wi-Fi devices and location based services, P2P availability is gradually increased. For example, it is expected that the P2P device will actively be used for social chatting (for example, wireless devices subscribed to Social Network Service (SNS) recognize radio devices located in a neighboring region on the basis of the location based service and transmit and receive information), location-based advertisement provision, location-based news broadcasting, and game interaction between wireless devices. For convenience of description, such P2P application will hereinafter be referred to as new P2P application.

Figure 5:
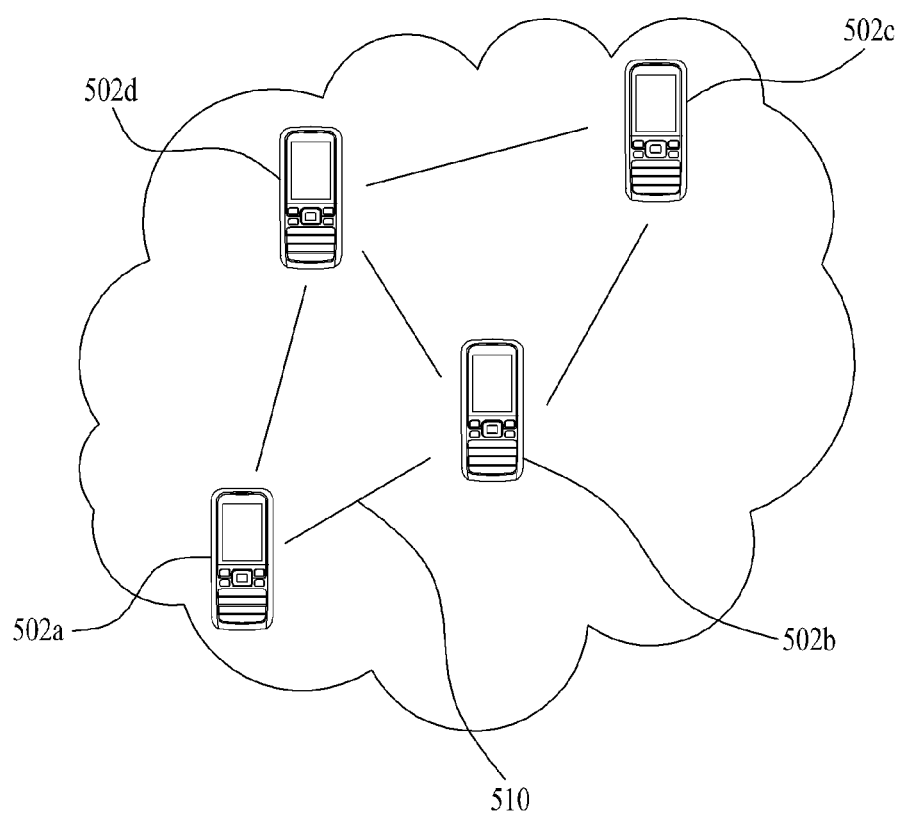
FIG. 5 is a diagram illustrating new aspect of a WFD network.

FIG. 5 is a diagram illustrating new aspect of a WFD network.

The example of FIG. 5 may be understood as WFD network aspect for use in the case in which new P2P application (e.g., social chatting, location-based service provision, game interaction, etc.) is applied.

Referring to FIG. 5, a plurality of P2P devices 502a to 502d performs P2P communication 510 in the WFD network, P2P device(s) constituting the WFD network may be changed at any time due to movement of the P2P device(s), and a new WFD network may be dynamically generated or deleted within a short time. As described above, characteristics of the new P2P application indicate that P2P communication may dynamically be performed and terminated within a short time among a plurality of P2P devices in the dense network environment.

Figure 6:
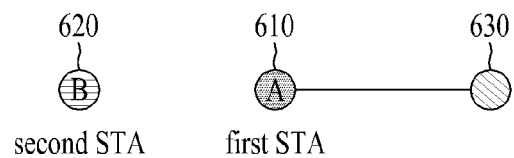
FIG. 6 is a diagram illustrating a method for setup of a link for WFD communication.
Figure 6:
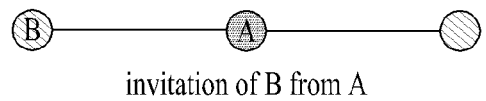

FIG. 6 is a diagram illustrating a method for setup of a link for WFD communication.

As shown in FIG. 6a, a first STA 610 (hereinafter, referred to as "A") is being operated as a group owner during conventional WFD communication. If the A 610 discovers a second STA 620 (hereinafter, referred to as "B"), which is a new WFD communication target and does not perform WFD communication, during communication with a group client 630 of conventional WFD communication, the A 610 tries link setup with the B 620. In this case, new WFD communication is WFD communication between the A 610 and the B 620, and since the A is a group owner, the A may perform communication setup separately from communication of the conventional group client 630. Since one WFD group may include one group owner and one or more group clients, as shown in FIG. 6b, a WFD link may be set as the A 610 which is one group owner is satisfied. In this case, the A 610 invites the B 620 to the conventional WFD communication group, and in view of WFD communication characteristic, WFD communication between the A 610 and the B 620 and between the A 610 and the conventional group client 630 may be performed but WFD communication between the B 620 and the conventional group client 630 is not supported. This is because that both the B 620 and the group client 630 are the group clients.

Figure 7:
FIG. 7 is a diagram illustrating a method for association with a communication group that performs WFD.
Figure 7:
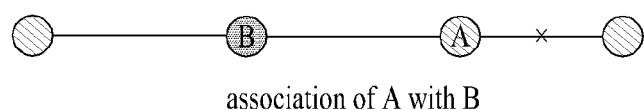

FIG. 7 is a diagram illustrating a method for association with a communication group that performs WFD, As shown in FIG. 7a, a first STA 710 (hereinafter, referred to as "A") is performing communication as a group owner for a group client 730, and a second STA 720 (hereinafter, referred to as "B") is performing communication as a group owner for a group client 740. As shown in FIG. 7b, the A 710 may terminate conventional WFD communication and may perform association with a WFD communication group to which the B 720 belongs. Since the A 710 is a group owner, the A 710 becomes a group client. Preferably, the A 710 terminates the conventional WFD communication before requesting association with the B 720.

Figure 8:
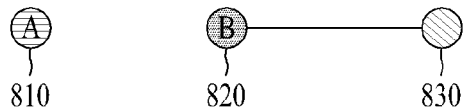
FIG. 8 is a diagram illustrating a method for setup of a link for WFD communication.
Figure 8:

FIG. 8 is a diagram illustrating a method for configuring a link for WFD communication.

As shown in FIG. 8a, a second STA 820 (hereinafter, referred to as "B") is being operated as a group owner during conventional WFD communication. If the B 820 is performing conventional WFD communication with a group client 830, a first STA 810 (hereinafter, referred to as "A"), which does not perform the WFD communication, discovers the B 820 and tries link setup for new WFD communication with the B 820. In this case, if the B 820 accepts link setup, a new WFD communication link between the A 810 and the B 820 is set, and the A 810 is operated as a client of conventional WFD group of the B 820. This case corresponds to the case where the A 810 performs association with the WFD communication group of the B 820. The A 810 may only perform WFD communication with the B 820 which is a group owner, and WFD communication between the A 810 and the client 830 of the conventional WFD communication is not supported. This is because that both the A 810 and the client 830 are the group clients.

Figure 9:
FIG. 9 is a diagram illustrating a method for setup of a link that is associated with a WFD communication group.
Figure 9:

FIG. 9 is a diagram illustrating a method for configuring a link that is associated with a WFD communication group.

As shown in FIG. 9a, a first STA 910 (hereinafter, referred to as "A") is performing WFD communication as a group client for a group owner 930. At this time, the A 910 discovers a second STA 920 (hereinafter, referred to as "B"), which is performing communication as a group owner for a group client 940 of another WFD communication, and terminates a link with the group owner 930. And, the A 910 may perform association with Wi-Fi Direct of the B 920.

Wi-Fi Direct Service (WFDS)

Wi-Fi Direct is the network connection standard technology defined to include an operation of a link layer. Since the standard of an application operated in an upper layer of a link configured by Wi-Fi Direct is not defined, it is difficult to support compatibility in the case that the application is driven after devices which support Wi-Fi Direct are interconnected. To solve this problem, standardization of the operation of the upper layer application called Wi-Fi Direct Service (WFDS) has been discussed by the Wi-Fi Alliance (WFA).

Figure 10:
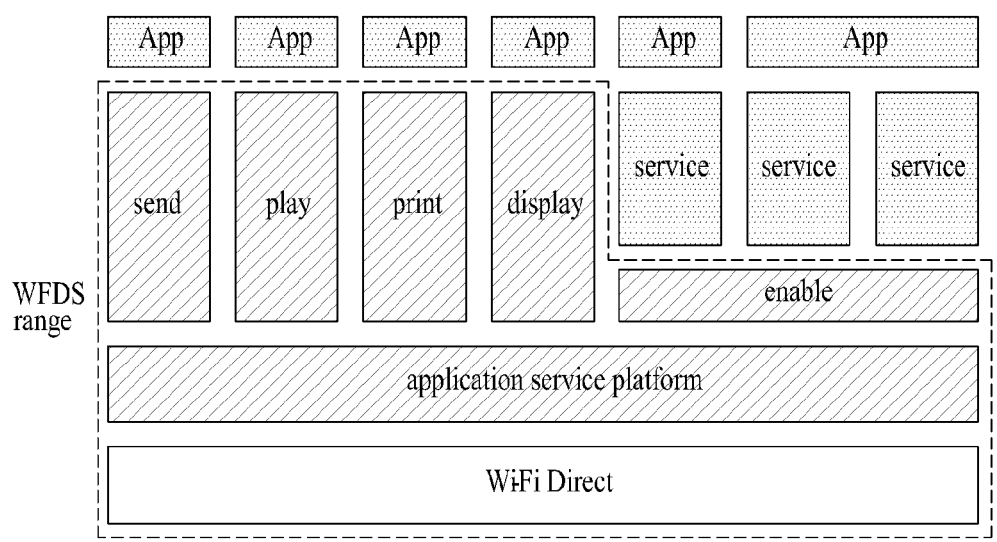
FIG. 10 is a diagram illustrating WFDS framework components.

FIG. 10 is a diagram illustrating WFDS framework components.

A Wi-Fi Direct layer of FIG. 10 means a MAC layer defined by the Wi-Fi Direct standard. The Wi-Fi Direct layer may include software compatible with the Wi-Fi Direct standard. Wireless connection may be configured below the Wi-Fi Direct layer by a physical layer (not shown) compatible with WiFi PHY layer. A platform called an ASP (Application Service Platform) is defined above the Wi-Fi Direct layer.

The ASP is a logical entity that implements functions required for services. The ASP is a common shared platform, and may process tasks such as device discovery, service discovery, ASP session management, connection topology management and security between an application layer above the ASP and the Wi-Fi Direct layer below the ASP.

A service layer is defined above the ASP. The service layer includes use case specific services. The WFA defines four basis services, Send, Play, Display and Print services. The four basic services defined in the WFA will be described briefly. First of all, Send means service and application that may perform file transfer between two WFDS devices. The Send service may be referred to as a file transfer service (FTS) in that it is intended for file transfer between peer devices. Play means a service and application that shares or streams audio/video (AN), photo, music, etc. based on DLNA (Digital Living Network Alliance) between two WFDS devices. Print means a service and application that enables documents and photos to be output between a device having contents such as documents, photos, etc. and a printer. Display means a service and application that enables screen sharing between a Miracast source and a sink of WFA.

An enable API (Application Program Interface) shown in FIG. 10 is defined to use an ASP common platform in the case that a third party application in addition to basic service defined by the WFA is supported. The service defined for the third party application may be used by one application only, or may be used generally (or commonly) by various applications.

Hereinafter, for convenience of description, the service defined by the WFA will be referred to as a WFA service, and the service newly defined by the third party not the WFA will be referred to as an enable service.

The application layer may provide a user interface (UI), and serves to express information to be recognized by the user and transfer an input of the user to a lower layer.

Figure 11:
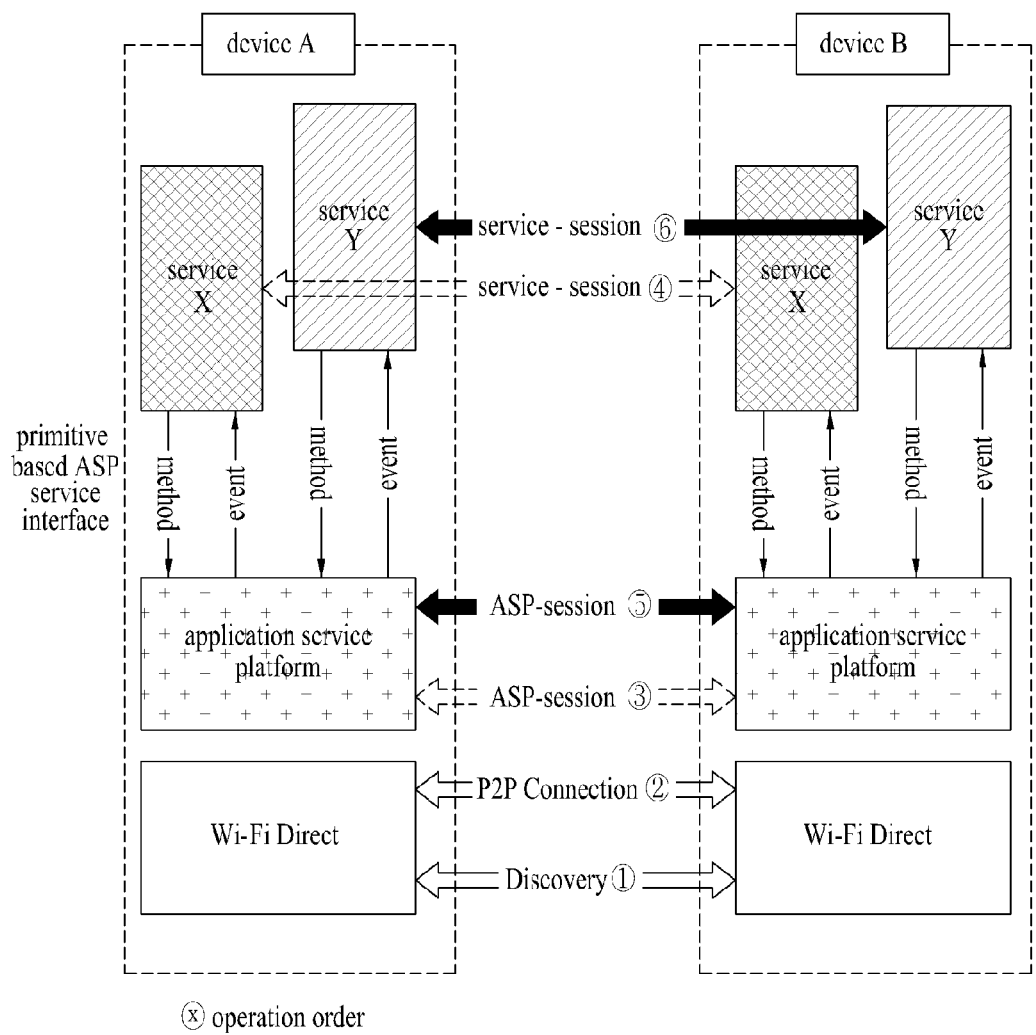
FIG. 11 is a diagram illustrating WFDS operation.

FIG. 11 is a diagram illustrating WFDS operation.

In FIG. 11, it is assumed that two peer devices A and B exist.

The ASP is a logical entity that implements common functions required by the services. These functions may include device discovery, service discovery, ASP-session management, connection topology management, security, etc.

The ASP-session is a logical link between the ASP of the device A and the ASP of the device B. Peer-to-peer (P2P) connection between peer devices is required to start the ASP-session. The ASP may setup a plurality of ASP-sessions between the two devices. Each of the ASP-sessions may be identified by a session identifier allocated by the ASP that requires the ASP-session.

The service is a logical entity that provides other services or application with use case specific functions by using the ASP. The service of one device may perform communication with the corresponding service of one or more other devices by using a service-specific protocol (that may be defined by the service standard and ASP protocol).

The interface between the ASP and the service is defined by Method and Event. The Method indicates the operation initiated by the service, and information on an operation which will be performed may be included in a parameter (or field) of the Method. The Event provides information from the ASP to the service.

Figure 12:
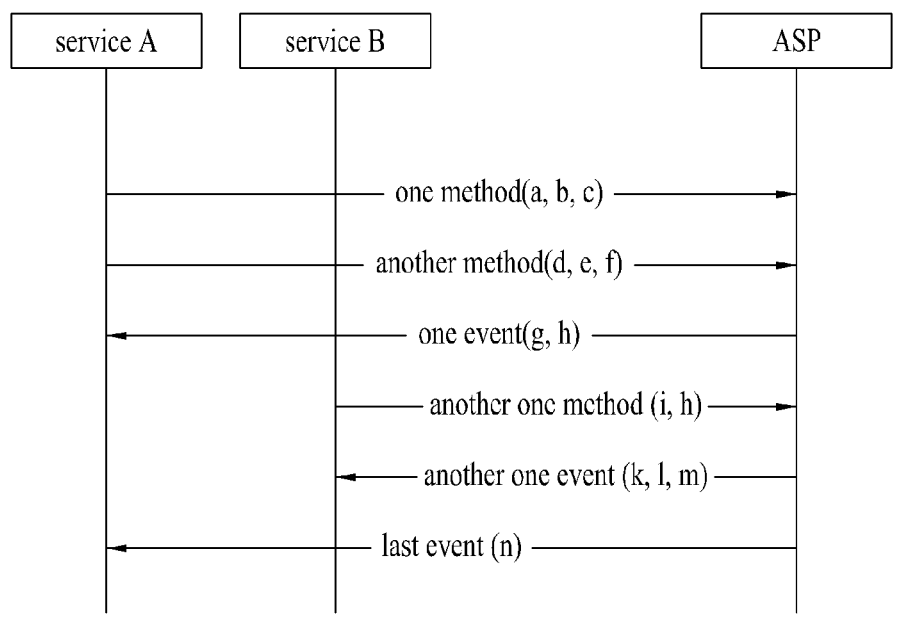
FIG. 12 is a diagram illustrating an example of transmitting Event and Method between an ASP and a service.

For example, FIG. 12 is a diagram illustrating an example of transmitting Event and Method between an ASP and a service.

If the service performs Method call, information limited to a method call returning value returns to the service. Every Method call basically returns immediately. Accordingly, the value returning to the service should not depend on either information acquired through the network, which causes delay of method call return, or information acquired from the user.

The ASP provides information to the service through the Event. In the same manner as the Method, the Event transmits data to the parameters. Since the Event is transmitted in one direction, if the service takes action on the basis of content of the Event, Method call should be accompanied.

A plurality of services that perform communication with the ASP may use the Method and the Event. The Method may be propagated from the service to the ASP, and the Event may be propagated from the ASP to a specific service. The Event does not need to immediately respond to Method call.

Referring to FIG. 11 again, if the user desires to use service X between the device A and the device B, the ASPs on the respective devices generate ASP-session dedicated for the service X between the devices. Afterwards, if the user desires to use service Y, new ASP-session for the corresponding service is established. If a plurality of ASP sessions are established between the peer devices, each of the plurality of ASP sessions may be identified by a session identifier allocated by the peer device (specifically, ASP of the peer device that has requested establishment of the ASP session) that has requested establishment of the ASP session.

In defining the operation between the two peer devices in the WFDS, one of the two peer devices may serve as a service advertiser and the other one may serve as a service seeker. If the service seeker searches for a desired service by discovering service advertiser(s), the service seeker may request connection with the service advertiser.

The peer device set by the service seeker searches for the peer device set by the service advertiser, and if the peer device set by the service seeker discovers a desired service from the peer device set by the service advertiser, the corresponding peer device may request the peer device set by the service advertiser of connection. In more detail, if the service seeker requests the service advertiser of ASP service session establishment, the service advertiser may respond to the ASP session establishment request of the service seeker.

The relation between the service advertiser and the service seeker is not fixed. For example, the role as the service advertiser and the service seeker may be varied depending on any one ASP session and next ASP session. Whether the peer device acts as the service advertiser or the service seeker may be determined based on which peer device has started to search for the service. In other words, the peer device that requests search of the service may act as the service seeker.

Also, any one of the peer devices may be set to both the service advertiser and the service seeker for the same service, and may have a plurality of service advertisers or a plurality of service seekers. For example, any one of the peer devices may be set to the service advertiser for the first Wi-Fi Direct service and the second Wi-Fi Direct service, and at the same time may be set to the service seeker for the third Wi-Fi Direct service and the fourth Wi-Fi Direct service.

Hereinafter, the service advertiser and the service seeker will be described in more detail.

Service Advertiser and Service Seeker

The peer device set to the service advertiser may advertise service(s), and the service seeker may discover the advertised service(s). The peer device set to the service advertiser may advertise service(s) until a call of cancel service advertisement method CancelAdvertiseService Method is performed or an advertisement status is set to 'Cancel' (for example, status value of AdvertiseStatus parameter indicates NotAdvertised). At least one of post association and pre-association may be used to allow the service advertiser to advertise the service(s).

The service(s) advertised by the service advertiser may be identified by service name. In more detail, the peer devices may control the services such that each service may include UTF-8 service name text strings for the service search. In this case, the service name encoded as UTF-8 may have a length 255 bytes or less. The length of the service name may be determined by a space that may be used by a service search request frame and a service search response frame.

The text string "org.wi-fi" may be reserved to identify the WFA service. In more detail, the WFA service names are as follows.

org.wi-fi.wfds.send.tx
org.wi-fi.wfds.send.rx
org.wi-fi.wfds.play.tx
org.wi-fi.wfds.play.rx
org.wi-fi.wfds.display.tx
org.wi-fi.wfds.display.rx
org.wi-fi.wfds.print.tx
org.wi-fi.wfds.print.rx If the enable service attempts advertisement or search by using the service name starting from org.wi-fi, the ASP may reject attempt of the enable service for advertisement or search. For the enable service, reverse domain name notation may be used. According to the reverse domain name notation, reverse arrangement (for example, com.example) of respective components (for example, example and com) at DNS name (for example, example.com) owned by an application author may be used as a prefix of service name of the enable service.

Accordingly, the name of the enable service may be defined as follows.

com.example.serviceX
com.example.productY
com.example.04cf75db-19d1-4d84-bef3-b13b33 fcfa5a The enable service may be defined for one application, and may be defined to be generally implemented in various applications.

The service is identified by service name and at the same time defined as service information. Accordingly, even in case of services of the same service name, if the services have different kinds of service information, the services may be handled as those different from each other.

In advertising the services, the service advertiser may allocate advertisement ID to each service which is advertised. The service advertiser may control the services such that separate advertisement ID may be allocated to each service.

The service advertisement may be used even in case of post association. To this end, the peer devices may establish additional ASP session after P2P group is formed.

The service search procedure is not required necessarily in the case that the service seeker starts ASP session. The service seeker may allow an out of band mechanism to perform the service search procedure. Also, the service seeker may cache the service of the peer device, wherein the service is already discovered.

The service search procedure may support wild card search (or name search). Wild card search may mean that prefix search is supported. Prefix search may mean that search of all the services including prefix may be performed. For example, in order to search for all the WFA services (that is, Send, Play, Display, Print), wild card search including search keyword 'org.wi-fi.wfds.*' (or 'org.wi-fi.wfds*') may be allowed. In this case, as a result of wild card search, a list of all the services including 'org.wi-fi.wfds" may be returned.

In order to search for a specific WFA service, wild card search including a search keyword 'org.wi-fi.wfds.servicename.*' (or 'org.wi-fi.wfds.servicename*') (in this case, servicename may be any one of Send, Play, Display, and Print) may be allowed. In this case, as a result of wild card search, a list of all the services including prefix 'org.wi-fi.wfds.servicename' may be returned. Of course, wild card may be allowed even in case of the enable service.

Wild card search may be allowed for words separated from each other by dot ('.'). For example, if the name of the enable service is "com.example.serviceX", wild card search may be allowed for 'com.*'(or 'com*'), 'com.example.*'(or 'com.example*').

Hereinafter, Method and Event, which are handled by the service advertiser and the service seeker, will be described in more detail.

Method of Service Advertiser

The service advertiser may call Advertise Service Method to advertise services. In this case, the service seeker may start search, discovery and ASP session of the service which is advertised. Advertise Service Method may include at least one of service name parameter (or list parameter of service name), port parameter, protocol parameter, sharing parameter, automatic acceptance parameter, and service information parameter. Each parameter will be described as follows.

i) Service Name (or List of Service Names)

The service name identifies features of a service that may be searched by the service seeker that requests service search (for example, performs SeekService Method call). Service name matching may be performed through comparison between the service name and text string included in a query from the service seeker.

If a plurality of services are used for matching, Advertise Service Method may include a list of service names including a plurality of service names. For example, if the service supports transmission and reception through the same port, service name (for example, service.tx) for transmission and service name (service.rx) for reception may be included in the list of service names. For example, if the service name requesting search is org.wi-fi.wfds.send, and the service supports both org.wi-fi.wfds.send.rx and org.wi-fi.wfds.send.tx, the list of service names may include "org.wi-fi.wfds.send", "org.wi-fi.wfds.send.rx" and "org.wi-fi.wfds.send.tx".

If the service supports all the WFA services through the same port number, the list of service names may include names of all the WFA services and service name for transmission from all the WFA services. For example, if the service supports all WFA services, the list of service names may include "org.wi-fi.wfds.send.tx, org.wi-fi.wfds.send.rx, org.wi-fi.wfds.send, org.wi-fi.wfds.play.tx, org.wi-fi.wfds.play.rx, org.wi-fi.wfds.play, org.wi-fi.wfds.display.tx, org.wi-fi.wfds.display.rx, org.wi-fi.wfds.display, org.wi-fi.wfds.print.tx, org.wi-fi.wfds.print.rx, and org.wi-fi.wfds.print".

ii) Service Port

The service port is an IP port that listens to a registered service and is also an IP port for connection, which is received from the service seeker. The service advertiser may notify the service seeker of the service port as a result parameter of service name search. However, the service port may not be searched by the service seeker unlike the service name. Since the service port is reserved, the same service port cannot be used by different services or different active ASP sessions as far as the service port is not set to be shared by them (for example, as far as sharing parameter is not set to "true").

When AdvertiseService method requesting service advertisement is called, if the service port cannot be used, Event (for example, Advertise Failed Event) indicating that service advertisement has been failed may be transmitted from the ASP to the service.

When the ASP session for the service is generated, and the network interface is known, the service port may be bound by the application.

iii) Protocol

The protocol may be defined as an integer defined in the IANA (Internet Assigned Number Authority). For example, TCP may be defined as number 6, and UDP may be defined as number 17.

iv) Sharing

The sharing parameter indicates whether another service and service port will be allowed. For example, if the sharing parameter has a value of "True", the service port may be reused by another advertisement and ASP session. The ASP session that shares the service port should not control the service port exclusively. Unlike this, if the sharing parameter has a value of "Service", the service port may be reused by advertisement of other services having the same service name. If the sharing parameter has a value of "False", one service may control the service port exclusively.

If the service requests exclusive use of the service port used by the service which is being currently advertised, the ASP may transmit AdvertiseFailed Event indicating that advertisement has been failed, to the service. The ASP may transmit Event indicating that advertisement has been failed, to the service, even in the case that the service requests sharing of the service port of which exclusive use is reserved. The ASP may transmit Event indicating that advertisement has been failed, to the service, even in case that the service requests that the service port already shared with another Advertise Service Method should be set to a non-sharing service port.

v) Automatic Acceptance

The ASP of the service advertiser may transmit session request event SessionRequest Event to a service layer to set up the ASP session. At this time, if the automatic acceptance parameter has a value of "True", the service advertiser may accept every ASP-session request from the service seeker even though the service layer does not call session confirmation method ConfirmSession Method in response to the session request event.

However, if a parameter, get_network_config_PIN is set to True in the session request event SessionRequest Event, the event may be required to be transmitted from the service layer to the ASP layer as service confirmation method (or session confirmation method).

If the automatic acceptance parameter has a value of "False", the ASP of the service advertiser may determine whether to accept the ASP session request by waiting for reception of the session confirmation method from the service. The session request event for ASP session setup may be transmitted from the ASP to the service regardless of the value of the automatic acceptance parameter.

vi) Service Information

The service information means detailed information on the service used during the service search procedure. A content of the service information is a free-form selective parameter. If the service information exists, the service information may be transferred to the service seeker as one response within the service search response frame.

The service seeker may perform search on the basis of the content of the service information by embodying service information request within service seek method SeekService Method.

vii) Service Status

The service status indicates a status of the service at the time when Advertise Service Method is called. For example, if the service status parameter has a value of '1', it may indicate that the service is available, and if the service status parameter has a value of '0', it may indicate that the service is unavailable. However, even though the service is unavailable, the service advertiser may indicate that the device supports the corresponding service in response to the probe request frame or the service search request frame.

If the service status parameter has a value of '0' (that is, if the service is unavailable), the ASP may reject a request for ASP session setup.

viii) Network Role

The network role indicates whether the service advertiser should be set to a group owner (GO) in the P2P group. For example, if the network role parameter has a value of '1', it may indicate that the service advertiser should be set to GO within the P2P group, and if the network role parameter has a value of '0', it may mean that the status of the service advertiser is disregarded.

ix) Network Setup

The network setup parameter indicates desired WSC configuration method (WSC Config.Method) for connection. For example, if the network setup parameter has a value of '1', it may indicate WFDS default setup method or WSC PIN method, and if the network setup parameter has a value of '2', it may indicate WSC PIN method only.

x) Delay Session Response

A value of the delay session response parameter may be null basically as far as an explicit specific service is not provided. Also, the delay session response parameter may exist only if the value of the automatic acceptance parameter is "False".

If the value of the delay session parameter exists, the delay session parameter may be regarded as a message frame transmitted from the service advertiser to the service seeker when the value of the automatic acceptance parameter of the service advertiser is set to False and the service seeker desires to generate ASP session.

For example, if the service seeker transmits a provision search request frame to generate ASP session, the delay session parameter may be included in a provision search response frame transmitted from the service advertiser as a session information field.

For another example, if the service seeker transmits a session request message Request_Session message to generate ASP session, the delay session response parameter may be included in a deferred session ASP coordination protocol message as a delay session response field.

The ASP may return advertisement ID for Advertise Service Method. The advertisement ID is allocated by the ASP, and identifies advertisement uniquely on the device manipulated by the service of which advertisement is requested. And, the advertisement ID may be transmitted to the service seeker to establish ASP session of the advertised service.

The service advertiser may call Service Status Change Method (ServiceStatusChange Method) indicating service status change if the status of the existing advertisement is changed. The service status change method may include the advertisement ID and the service status parameter. Each parameter will be described as follows.

i) Advertisement ID

The advertisement ID may include originally advertisement ID returned by the Advertise Service Method.

ii) Service Status

If the service is in the available status, the value of the service status parameter may be set to "Available". If the service supported by the service advertiser is in the unavailable status at the time when the service is supported by the service advertiser, the value of the service status parameter may be set to "Unavailable". The value of the service status parameter may be included in the probe response frame or the service search response frame.

The service advertiser may call cancel service advertisement method CancelAdvertiseService Method to cancel the existing advertisement. If the service advertiser calls the cancel service advertisement method CancelAdvertiseService method, service name and associated information are not advertised any more, and reservation of the service port is released.

If the service receives the session request event from the ASP, the service advertiser may call the session confirmation method SessionConfirm Method to determine whether to accept ASP session setup. The session confirmation method may be referred to as service confirmation method ConfrmService Method in that it indicates whether to accept session setup of the specific service. However, if advertisement starts automatically (for example, if the value of the automatic acceptance parameter of the Advertise Service Method is "True"), since ASP session setup is accepted automatically, the session confirmation method may not be called.

The session confirmation method may include at least one of session MAC parameter, session ID parameter, and confirmed parameter. Each parameter will be described in more detail as follows.

i) Session MAC

The session MAC indicates MAC address of the device to which session ID is allocated.

ii) Session ID

The session ID indicates an identifier of ASP session.

iii) Confirmed

If the confirmed parameter has a value of True, ASP session setup may be performed. Also, if the existing P2P group does not exist, group may be formed. Unlike this, if the confirmed parameter has a value of False, the requested ASP session may be closed.

Method of Service Seeker

The service seeker may call service seek method SeekService Method that requests service search for searching for services of the peer device serving as the service advertiser. The search range may be limited selectively by MAC address. The service seek method may include at least one of service name, exact search, MAC address, and service information request parameter. Each parameter will be described in more detail as follows.

i) Service Name

The service name parameter indicates name of a service which should be searched. Text string included in the service name parameter may be exact name of the service which should be searched, and may be prefix of service name which should be searched.

An example of prefix search may include name only of specific service without including names of both reception service and transmission service, to search for the reception service and the transmission service for the specific service. For example, in order that the service searches for org.wi-fi.wfds.send.rx and org.wi-fi.wfds.send.tx for Send service, org.wi-fi.wfds.send commonly included in both org.wi-fi.wfds.send.rx and org.wi-fi.wfds.send.tx may be inserted to the service name parameter.

In order to search for all WFA services, text string "org.wi-fi.wfds" which is commonly included in all WFA service names may be included in the service name parameter.

ii) Exact Search

If the value of the exact search parameter is "True", exact search is performed. In more detail, the service exactly matched with the text string included in the service name parameter may be searched through exchange of probe request and response frames.

If the value of the exact search parameter is "False", prefix search is performed. In more detail, for prefix search, in addition to exchange of probe request and response frames, exchange of service search request and response frames may be performed. All the services that include the text string included in the service name parameter as prefix may be searched through exchange of the service search request and response frames.

Since only the device exactly matched with the text string included in the service name parameter responds to the probe request during device search, exact search is faster than prefix.

iii) MAC Address

Since the MAC address is intended to search for services of all of peer Wi-Fi Direct devices, MAC address parameter may generally be set to NULL. However, if MAC address value of a specific peer device is included in the MAC address parameter, service search may be performed restrictively for specified MAC address. MAC address of peer address may be included as canonical format (for example, "00:14:bb:11:22:33") identified by colon (:).

iv) Service Information Request

The service information request parameter may include text string for requesting additional information during service information search where the service advertiser is exchanged with the service search request/response frames.

If the text string querying service information request is a substring of a service information set included in the Advertise Service Method, search result event SearchResult Event may be called. For example, a query text string of "ABC" may be matched with service information read as "ABCpdq" or "ABC" among several kinds of service information.

A handle parameter that may be used for cancel service seek method (e.g., CancelSeekService Method) may be returned in response to service seek request method (e.g., ServiceSeek Method).

The service seeker may call the cancel service seek method CancelSeek Method canceling service search. The cancel service seek method may include the handle parameter returned by the service seek method.

Event of Service Advertiser

When a remote device desires to start ASP session for the advertised service, the ASP of the service advertiser may transmit a session request event SessionReqeust Event to the service. At this time, the session request event may be referred to as a service request event ServiceRequest Event in that it initiates start of the service. In more detail, the session request event may be triggered when the ASP of the service advertiser receives the provision search request frame or REQUEST_SESSION ASP coordination protocol message. The session request event may include parameters as follows.

i) Advertisement ID

When the Advertise Service Method is called, advertisement ID allocated by the ASP may be included in the session request event.

ii) Session MAC

MAC address of the P2P device to which session ID is allocated may be included in the session request event.

iii) Service Device Name

Device name (in more detail, device name defined by WSC) of the remote device may be included in the session request event.

iv) Session ID

Session ID allocated by a remote ASP may be included in the session request event.

v) Session Information

Service specific data payload may be included in the session request event. Session information may have a length of maximum 144 bytes.

vi) Network configuration PIN acquisition (get_network_config_PIN)

If the service advertiser receives the provision search request frame together with WSC configuration method (WSC Config method) requesting PIN (Personal Identification Number) for setting up the service network in the service advertiser, the value of the network configuration PIN acquisition parameter may be "True". WSC PIN input by the user may be included in the session confirmation method and then provided to the ASP.

If the service advertiser receives the provision search request frame together with WSC configuration method (WSC Config method) that does not request PIN (Personal Identification Number) for setting up the service network in the service advertiser, or if the service request event is triggered by the REQUEST_SESSION ASP coordination protocol message, the value of the network configuration PIN acquisition parameter may be "False".

vii) Network Configuration PIN

If the ASP of the service advertiser receives provision search request together with WSC configuration method requesting PIN which will be displayed for setup of the service network, the ASP may generate WSC PIN value, provide the generated WSC PIN value to the service and allow the WSC PIN value to be displayed.

If the ASP of the service advertiser receives provision search request together with WSC configuration method that does not request PIN which will be displayed for setup of the service network, or if the service request event is triggered by the REQUEST_SESSION ASP coordination protocol message, the value of the network setup PIN parameter may be '0'.

If the service cannot be advertised any more or advertisement of the service cannot start, an event (e.g., AdvertiseFailed Event) indicating advertisement failure may be transmitted. The event indicating advertisement failure may include advertisement ID and failure reason parameter. Each parameter will be described briefly as follows.

i) Advertisement ID

The advertisement ID may indicate advertisement ID value returned by Advertise Service Method.

ii) Reason

The reason of advertisement failure may indicate any one of the case where the service port is already shared (for example, non-sharing service port has been requested but the corresponding service port is already used as a sharing service port), the case where the service port is already used personally (for example, service port has been requested but the corresponding service port is already used as a personal (dedicated) service port), or other failure reasons.

Event of Service Seeker

When search is being performed, a search result event SearchResult Event indicating a search result for each advertised service discovered from the peer device may be transmitted. The search result event may include at least one of handle, service MAC, advertisement ID, service name, service information and service status parameter. Each parameter will be described as follows.

i) Handle

Handle indicates a value returned by the service seek method.

ii) Service MAC

Service MAC indicates MAC address of the peer device.

iii) Advertisement ID

Advertisement ID indicates advertisement ID defined by the peer device.

iv) Service Name

Service name indicates full service name defined by the peer device.

v) Service Information

Additional service (vendor) specific parameter or NULL text string, which is defined between the service advertiser or the service seeker, is included in the service information.

vi) Service Status

If the service is in the available status, the value of the service status parameter may be set to "Available". If the service supported by the service advertiser is in the unavailable status at the time when the service is supported by the service advertiser, the value of the service status parameter may be set to "Unavailable".

The service seeker may quit the search initiated by the service seek method SeekService Method or transmit search termination event SearchTerminated Event to prevent the search result event from being further generated. The search termination event may include handle and termination reason parameters. Each parameter will be described as follows.

i) Handle

Handle indicates search which is terminated.

ii) Reason

A termination reason of search may be indicated. Timeout or system failure SystemFailure may be indicated as the termination reason of search.

The service seeker may transmit a service request event ServiceRequest Event to start ASP session of the advertised service. The service request event may include at least one of advertisement ID, session MAC, session ID and session information parameter. Each parameter will be described as follows.

i) Advertisement ID

Advertisement ID defined by the peer device may be included in the service request event.

ii) Session MAC

MAC address of the peer device to which session ID is allocated may be included in the service request event.

iii) Session ID

ASP session ID may be included in the service request event.

iv) Session Information

Application specific data payload may be included in the service request event.

Service Search and ASP Session Setup

Based on the aforementioned description, the service search procedure and ASP session setup procedure according to the present invention will be described in more detail.

Figure 13:
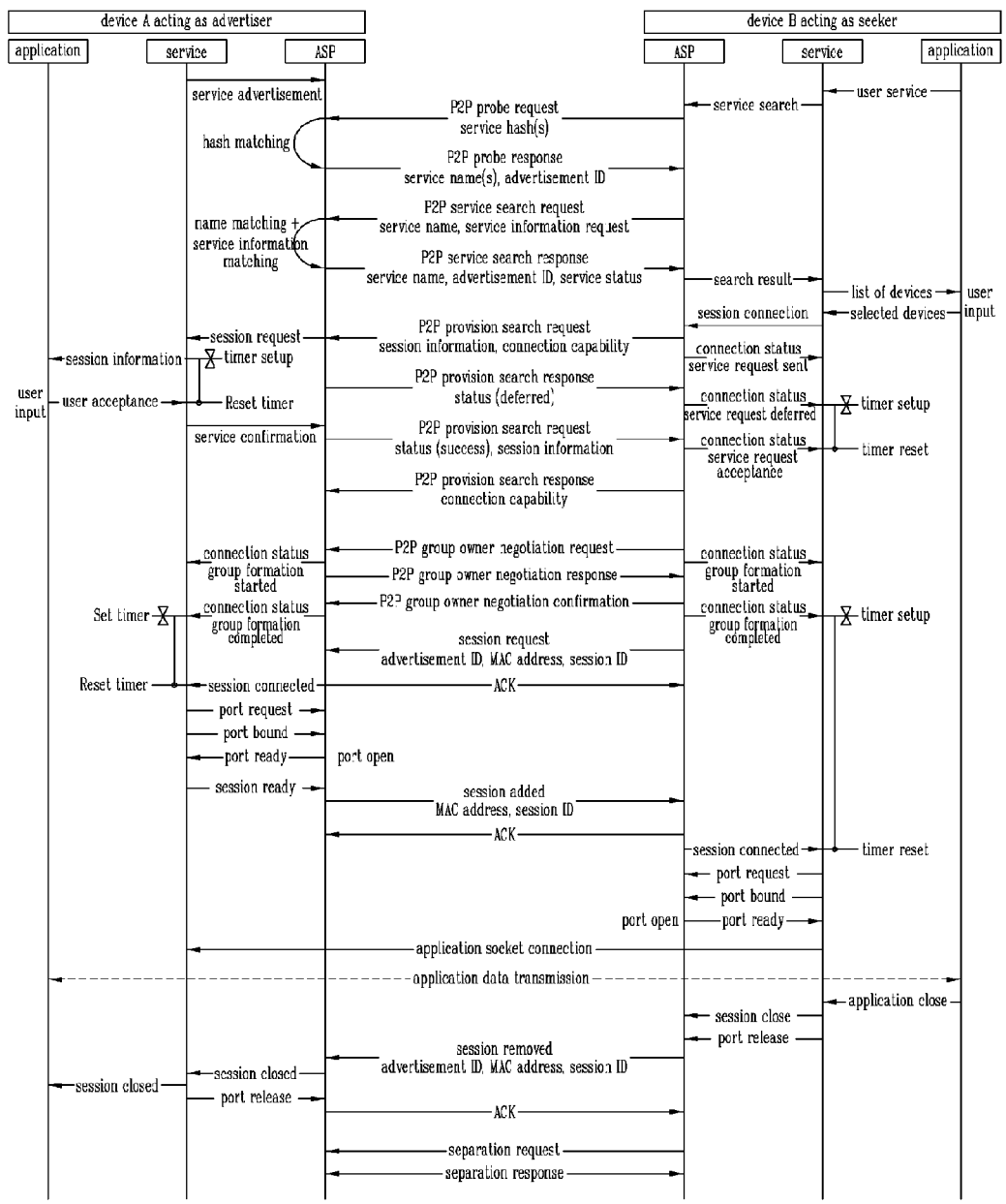
FIG. 13 is a flow chart illustrating service search and ASP session setup operation.

FIG. 13 is a flow chart illustrating service search and ASP session setup operation. The ASP session setup operation shown in FIG. 13 means that a specific service of a random P2P device searches for another P2P device and service, establishes Wi-Fi Direct connection by requesting the service, and an application is operated.

For convenience of description, in FIG. 13, it is assumed that device A is operated as a service advertiser for advertising its service and device B is operated as a service seeker for searching for a service.

If the service layer of the device A transmits the Advertise Service Method to the ASP, the ASP of the device A may advertise its service on the basis of information included in the Advertise Service Method and be on standby to allow another device to discover the corresponding service.

If the service layer of the device B transmits the service seek method to the ASP, the ASP of the device B may search for a device, which supports a higher application or a service desired by the user, on the basis of information included in the received service seek method. For example, if the service layer of the device B receives information indicating intention of Use Service from the application layer, the service layer may transfer the service seek method, which includes information on service that requires search, to the ASP.

The ASP of the device B, which has received the service seek method, may transmit the probe request frame to search for the device that supports a desired service. At this time, the probe request frame may include a hash value obtained by converting service name of a service, which is desired to be discovered or may be supported, to a hash form. The hash value is obtained by converting service name or prefix of service name to a hash form through the ASP, and may have a 6 octet length. The probe request frame may be transmitted in the form of broadcast, or may be transmitted in the form of unicast for a specific device.

The device A that has received the probe request frame may attempt hash matching, and if it is determined that a service matched with the hash value included in the probe request frame is supported, the device A may transmit the probe response frame to the device B. At this time, the probe response frame may include at least one of a hash value, an advertisement ID field, and a service notification information field. The hash value indicates the hash value of the service matched with the hash value requested through the probe request frame, and the advertisement ID field may be a value allocated by the ASP to uniquely identify advertisement of each service in the ASP. Advertisement ID may be used to request ASP session establishment. The service notification information field may include a service information indication field service_information_indication_field and a service status field service_status_field. The service information indication field may indicate whether service information exists for each service included in the probe response. The service status field may be used to indicate whether the service is available at the time when the probe response frame is transmitted.

If the device B receives the probe request frame indicating that the service desired to be discovered by the device B is available, the ASP of the device B may transmit the search result event to the service layer to report that the device, which supports the desired service, has been discovered. At this time, the search result event may include at least one of service name, advertisement ID, service status and service information parameter.

If the device B fails to discover the device, which supports the service desired to be discovered, transmission of the service search request frame may be omitted. Although not shown, the ASP of the device B may transmit the search result event to the service layer to indicate that the device, which supports the service desired to be discovered, has not been discovered. At this time, the search result event may include service name, advertisement ID, service status, and NULL service information parameter.

If the device B receives the probe request frame indicating that there is available service, from the device A, the device B may trigger the service search request frame to search for service information of the device A. At this time, the service search request frame may include a service name field. The service name field may include complete service name to be searched or prefix of service name to be searched.

In this respect, the device A may transmit the service search response frame, which indicates whether the service desired to be discovered by the device B may be provided, to the device B. The service search response frame may include service name, service status, advertisement ID and service information.

The service name may include text string indicating service name of advertised service.

Even though the device A supports the service desired to be discovered by the device B, the device B may not use the service provided by the device A at the time when the service search response frame is transmitted. For example, although the device A supports a Print service searched by itself, if the device A cannot allow association with the peer device any more due to association with maximum available devices, the device B cannot use the service provided by the device A in spite of the fact that the device A supports the service desired to be searched by the device B. Accordingly, the device A according to the present invention may include the service status information, which indicates whether the corresponding service is available at the time when the service search response frame is transmitted, in the service search response frame.

In other words, if the corresponding service is unavailable at the time when the service search response frame is transmitted, the service status information may indicate that the corresponding service is unavailable, whereas the service status information may indicate that the corresponding service is available if the corresponding service is available at the time when the service search response frame is transmitted. The service status information may be an indicator of 1 bit.

The advertisement ID field may be intended to uniquely identify advertisement for each service within the ASP.

The service information field may include optional information that may be shared between the device A which is the service advertiser and the device B which is the service seeker. If service information on the given service (that is, service desired to be discovered by the device B) exists, the service information field may include the hash value transmitted through the probe response frame matched with the given service.

However, in order to acquire the service information, the device B, which transmits the service search request frame, may need to use WFDS service protocol type (defined as an integer 5) to query exact service name and service information. The device B may search for the service on the basis of the content of the service information by embodying the service information request parameter included in the service seek method when the service layer calls the service seek method.

The aforementioned service search request and response frames may be performed using GAS (Generic Advertisement Protocol) defined in the IEEE 802.11u system.

If the operation requested by the service seek method requested from the service layer is completed, the ASP of the device B may notify the application and the user of the result based on the service search result through the service.

At this time, group of Wi-Fi Direct is not formed. If the service provided by the device A may be used and the service calls session connection method ConnectSession Method as the user selects the service of the device A, P2P group formation may be performed. At this time, session information and connection capability information are exchanged with each other through provision discovery request and provision discovery response.

The session information is hint information indicating brief information of the service requested by the device that requests the service. For example, the session information is the information that may allow the other party to determine acceptance/rejection of the service request by indicating the number and size of files if a file transfer services is requested. The connection capability information may be used as information for generating group during group owner (GO) negotiation and P2P invitation.

If the device B transfers the provision discover request message to the device A, the ASP of the device A transfers session request SessionRequest, which includes the service information, to the service layer, and the service layer transfers the service information to the application/user. If the application/user decides to accept the corresponding session on the basis of the session information, the service confirmation method is transferred to the ASP through the service layer.

At this time, the ASP of the device A transfers the provision discovery response message to the device B, wherein status information of the provision discovery response message may be set to 'deferred'. This is to notify that the corresponding service is not accepted immediately and the status waits for input of the user. Accordingly, the ASP of the device B may notify the service layer that service request has been deferred, while transferring ConnectStatus event to the service layer.

If the ASP of the device A receives the service confirmation method ConfirmService Method, a follow-on provision discovery procedure may be performed. In other words, the device A may transfer the provision discovery request message to the device B. This may be referred to as the follow-on provision discovery procedure. The provision discovery request message may include service information together with information indicating that the status for the corresponding service is 'success'. Accordingly, the ASP of the device B may notify the service layer that the service request has been accepted, while transferring ConnectStatus event to the service layer. Also, the ASP of the device B may transfer the provision discovery response message to the device A, wherein the provision discovery response message may include connection capability information.

After the P2P provision discovery procedure is performed, the P2P group is generated through GO negotiation or invitation procedure, and second layer (L2) connection and IP (Internet Protocol) connection are performed. For GO negotiation, a GO negotiation request frame and a GO negotiation response frame may be exchanged between the peer devices. The detailed description of the GO negotiation procedure will be omitted.

After P2P connection or IP connection is generated as GO negotiation is completed, the devices A and B transfer REQUEST_SESSION message requesting session through the ASP coordination protocol. The REQUEST_SESSION message may include advertisement ID, MAC address mac_addr, session ID, etc. The MAC address means an address of the P2P device. The device A may transfer ACK message to the device B in response to the REQUEST_SESSION message.

The device A may notify higher service/application that session has been connected, and the service layer may request the corresponding session of port information and bind the corresponding session and port. Accordingly, the ASP may open the corresponding port (ASP may open the port within a firewall), and may notify the service layer that the port has been ready. The service layer may notify the ASP of session ready method SessionReady Method indicating that session has been ready.

Accordingly, the ASP of the device A transmits ADDED_SESSION message to the other party device. At this time, the ADDED_SESSION message may include session ID and MAC address information, whereby the service may be identified uniquely. The ASP of the device B, which has received the ADDED_SESSION message, may notify the service layer of session connection and may also notify the service layer that the port has been ready (PortReady( )) through port request, port binding, etc. The ASP may open the port within the firewall.

Afterwards, application socket connection between the service layers of the device A and the device B may be notified, and a link for transmission of application data is formed by the application layer, whereby the application data may be transmitted and received through the link.

Termination (Close Application) of the corresponding application may be indicated to the service layer by the application/user of the device B. As a result, the service layer may transfer session termination method ClosedSession Method to the ASP, and may notify the ASP that the corresponding port has been released.

Accordingly, the ASP of the device B may request the device A of termination of the service connected through REMOVE_SESSION message. The REMOVE_SESSION message may include advertisement ID, MAC address, session ID, etc.

The ASP of the device A may notify the application/user of session termination through the service layer, and the service layer may notify the ASP of port release. As a result, the ASP may close incoming port within the firewall if there is no session which is active for the corresponding service. The device A may transfer ACK message of the REMOVE_SESSION message to the device B, and the ASP of the device B may also close the incoming port within the firewall if there is no session which is active for the corresponding service.

Afterwards, the device A and the device B may terminate P2P connection and mutual association through diassociation request/response.

Message sequence between the service seeker and the service advertiser if the service request is initiated using the P2P provision discovery procedure has been described with reference to the example of FIG. 13. In the example of FIG. 13, it is assumed that the automatic acceptance parameter is set to FALSE. If the automatic acceptance parameter is set to TRUE, the ASP may be operated to accept all ASP-session service requests even there is no session confirmation method from the service. Also, each ASP may notify the service of the current status by using SessionStatus Event and ConnectionStatus Event.

Hereinafter, the service search procedure in the WFA services will be described in detail. For convenience of description, Send service of the WFA services will be described exemplarily. However, the following embodiments may be applied to the WFA service other than the Send service and the enable service.

Service Search Procedure in Send Service

Figure 14:
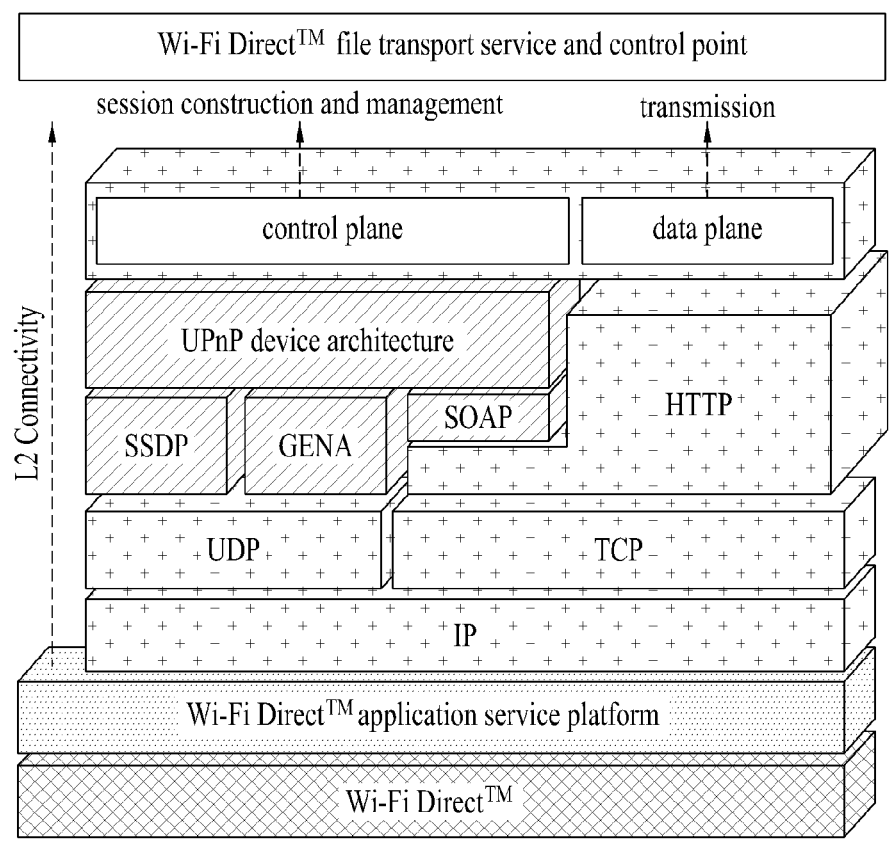
FIG. 14 is a diagram illustrating an architecture of a Wi-Fi direct file transport service.

FIG. 14 is a diagram illustrating an architecture of a Send service of Wi-Fi direct file. An ASP layer and a Wi-Fi Direct layer shown in FIG. 14 may serve to provide L2 connection of the peer device.

At the Wi-Fi Direct service search step, the peer device may exchange information on service capabilities with another peer device. In more detail, the peer device may exchange information as to whether a file send service will be supported, with another peer device. If another peer device that enables the file send service is searched, the ASP of the peer device may perform association with the searched device.

A control plane may be used to establish Wi-Fi Direct file transfer service session between the peer devices. The control plane may include UPnP enabled Wi-Fi Direct (WFD) FTS control point and UPnP enabled P2P FTS component.

A data plane may provide a transmission path for actual transmission of file data. For file transfer, HTTP (Hyper Text Transfer Protocol) may be used.

Figure 15:
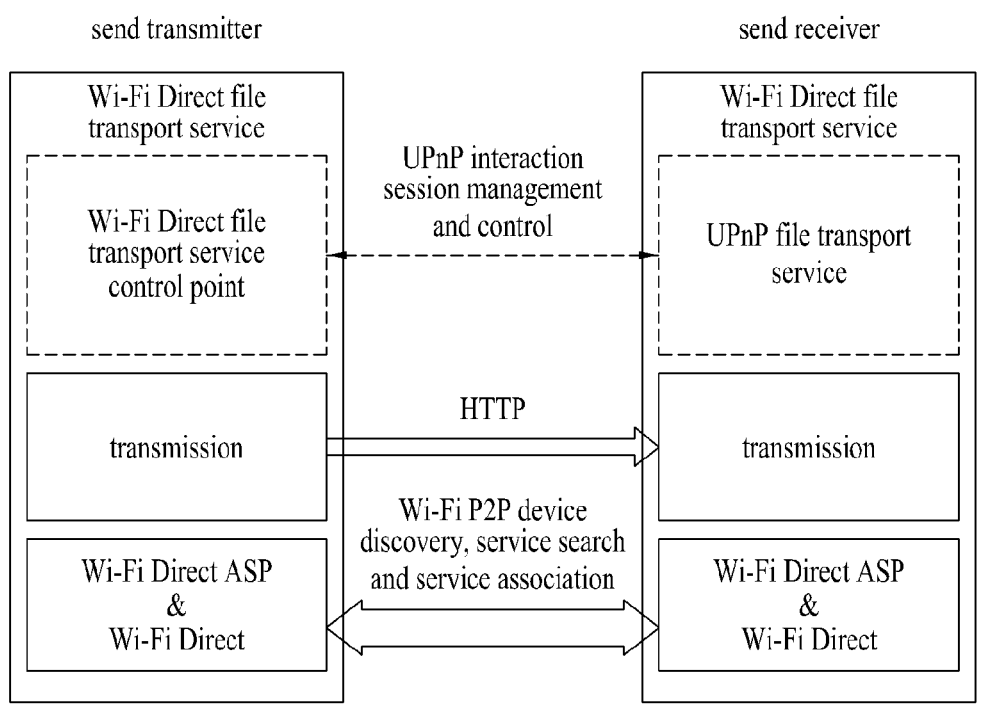
FIG. 15 is a diagram illustrating that an operation between a send transmitter and a send receiver is briefly schematized per layer.

Any one of the peer devices that use the FTS may be operated as a send transmitter and the other one may be operated as a send receiver. For example, FIG. 15 is a diagram illustrating that an operation between a send transmitter and a send receiver is briefly schematized per layer.

The send transmitter and the send receiver may perform device search, service search, and service association through the Wi-Fi Direct layer and the ASP layer.

If service association between the send transmitter and the send receiver is completed, the send transmitter may start file transfer session of another peer device (that is, send receiver), and may perform file transfer by using HTTP from a transport layer which is a higher layer.

In transmitting file data from the transport layer, the send transmitter may serve as HTTP client, and the send receiver may serve as HTTP server. The send transmitter may transmit file data to the HTTP server (that is, send receiver) by using HTTP PUT method, and the send receiver may receive file data from the send transmitter.

The send receiver serving as the HTTP server may open a specific TCP port to receive the transmitted file.

The send receiver may hot UPnP service for file transfer. The send transmitter may invoke UPnP action(s) on WFDS hosted by the send receiver, through the UPnP control point.

Figure 16:
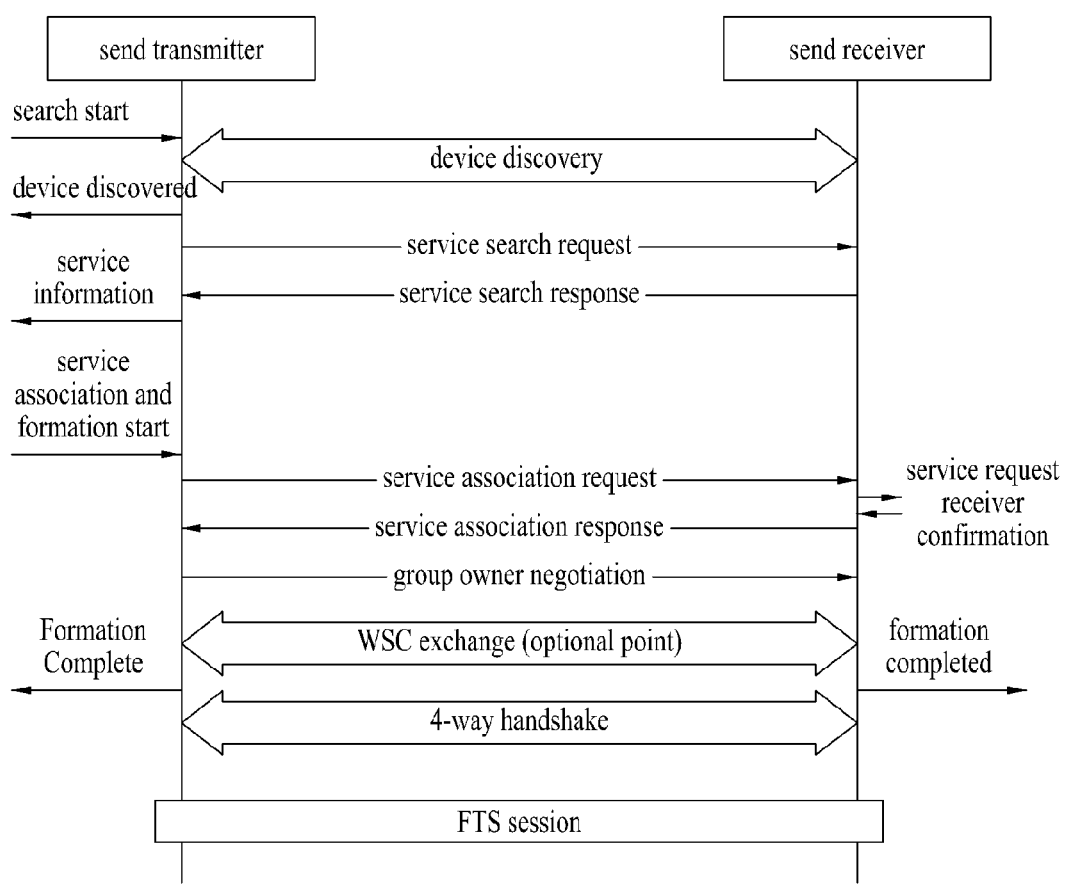
FIG. 16 is a diagram illustrating a procedure of establishing L2 connection in FTS.

FIG. 16 is a diagram illustrating a procedure of establishing L2 connection in FTS. Referring to FIG. 16, first of all, the send transmitter may perform Wi-Fi Direct device search procedure for searching for a send receiver for establishing FTS session.

Afterwards, the send transmitter may transmit a service search request frame for requesting search of a file transfer service. The service search request frame may be transmitted in the form of broadcast, or may be transmitted to a specific peer device in the form of unicast.

The service search request frame may include service version information desired to be discovered by the send transmitter. For example, if service version information is 0x01, it may indicate Wi-Fi Direct FTS version 1.

The send receiver that has received the service search request frame may transmit the service search response frame in response to the service search request frame.

If the send receiver supports the service desired to be discovered by the send transmitter and service version, L2 service association between the send receiver and the send transmitter may be performed.

In more detail, the send transmitter may transmit the service association request frame to the send receiver, and the send receiver may transmit the service association response frame to the send transmitter in response to the service association request frame. At this time, the service association request frame and the service association response frame may be performed using GAS (Generic Advertisement Protocol) defined in the IEEE 802.11u system.

A vendor-specific content may be included in the service association request frame and the service association response frame. For example, Table 1 lists fields that may be inserted to the vendor-specific content.

TABLE 1

| Field Name | Size (octets) | Value | Description |
| --- | --- | --- | --- |
| OUI Subtype | 1 | 0x10 | WFA OUI Subtype indicates Service Associated Frame |

TABLE 1-continued

| Field Name | Size (octets) | Value | Description |
| --- | --- | --- | --- |
| Service Association Update Indicator | 2 | Variable | The Service Association Update Indicator is a counter that is incremented when a change has occurred in the service information of the device sending this Service Association Request or Response frame |
| Service Association TLV | Variable | Variable | Service Association TLV |

As disclosed in Table 1, the service association request frame and the service association response frame may commonly include OUI (Organizationally Unique Identifier) subtype field, a service association update indicator field and a service association TLV (Type, Length, Value) field.

The OUI subtype field may indicate that the corresponding frame is the service association frame.

The service association update indicator is a counter increased as much as 1whenever service information of the device, which transmits the service association request frame or the service association response frame, is changed. The send transmitter and the send receiver may determine whether service information of the other party has been updated by storing an update indicator value received from the other party and comparing the stored value with an update indicator value when the service association request frame or the service association response frame is received.

The service association TLV (Type, Length, Value) field may be referred to as a service request TLV or service response TLV depending on whether it is included in the service association request frame or the service association response frame. Table 2 illustrates the service request TLV of the service association request frame.

TABLE 2

| Field Name | Size (octets) | Value | Description |
| --- | --- | --- | --- |
| Length | 2 | Variable | Length of the Service Association Request Information |
| Service Protocol Type | 1 | 0x05 | Service Protocol types (FTS is 0x05) |
| Service Transaction ID | 1 | Variable | Service Transaction ID is a nonzero value used to match the Service Association Request/Response |
| TCP port | 2 | Valid TCP port number | TCP port number which is required by Send Transmitter |
| Send Service Meta Info | Variable | Variable | Defines the service specific information |

As disclosed in Table 2, the service request TLV included in the service request frame may include a length field, a service protocol type field, a service transaction ID field, a TCP port field, and a transport service meta information field.

The length field indicates a length of the service request TLV.

The service protocol type field indicates a service protocol type of WFDS. For example, Table 3 is intended to describe a value per service protocol type.

TABLE 3

| Value | Meaning |
|---|---|
| 0 | All Service Protocol Types |
| 1 | Bonjour |
| 2 | UPnP |
| 3 | WS-Discovery |
| 4 | Wi-Fi Display |
| 5 | Wi-Fi Direct Service Send |
| 6 | Wi-Fi Direct Service Play |
| 7 | Wi-Fi Direct Service Display |
| 8 | Wi-Fi Direct Service Print |
| 9 | Wi-Fi Direct Service Enable |
| 10-254 | Reserved |
| 255 | Vendor-specific value |

In the example listed in Table 3, the value 0x5of the service protocol type field may indicate a protocol type for FTS.

The service transaction ID field is the identifier issued for matching of the service association request frame and the service association response frame. For example, the send transmitter that has transmitted the service association request frame may perform service association by receiving the service association response frame having the same transaction ID as that of the transmitted service association request frame.

The TCP port field indicates a value of a TCP port required for file transfer.

The send service meta information field may include service specific information. In this case, the service specific information may be required to provide the peer device with hint. For example, Table 4 is intended to describe the send service meta information.

TABLE 4

| Field | Size | Interpretation |
|---|---|---|
| Note | 128 | Free text interpreted in ASCII format |
| Size | 4 | Total size in Kbytes |
| NoofItems | 2 | Number of items included |
| Item | 133 * NoofItems value | Meta information lists |

As disclosed in Table 4, the service meta information field may include a note field, a size field, a Nooflitems (Number of Items) field, and an item field.

Free text in the form of ASCII may be input to the note field.

The size field indicates a total size (Kb unit) of the send service meta information field.

The Nootitems (Number of Items) field may indicate the number of items included in the send service metal information.

The item field indicates information of file which will be transmitted. In more detail, the item field may include at least one of name of file which will be transmitted, a size of file which will be transmitted, and information on a type of file which will be transmitted. For example, Table 5 is intended to describe the item field. The size of the item field may be increased linearly in proportion to the number of files which will be transmitted.

TABLE 5

| Field | Size | Interpretation |
|---|---|---|
| Name | 128 | File Name |
| Size | 4 | Total size in Kbyte |
| Type | 1 | Bit 0: 1 file or 0 folder |
|  |  | Bit 1: Reserved |

Table 6 is intended to describe the service response TLV of the service association response frame.

TABLE 6

| Field Name | Size (octets) | Value | Description |
|---|---|---|---|
| Length | 2 | Variable | Length of the Service Association Response TLV |
| Service Protocol Type | 1 | 0x05 | Service Protocol types (FTS is 0x05) |
| Service Transaction ID | 1 | Variable | Service Transaction ID is a nonzero value used to match the Service Association Request/Response TLVs |
| Status Code | 1 |  | Status code for the requested service information |
| TCP Port | 2 | Valid TCP port | TCP port number |

As disclosed in Table 6, the service response TLV may include a length field, a service protocol type field, a service transaction ID field, a status code field, and a TCP port field.

The length field indicates a length of the service response TLV.

The service protocol type field indicates a service protocol type of WFDS. For example, the value 0x05 of the service protocol type field may indicate a protocol type for FTS.

The service transaction ID field is the identifier issued for matching of the service association request frame and the service association response frame. For example, the send transmitter that has transmitted the service association request frame may transmit the service association response frame having the same transaction ID as that of the transmitted service association request frame to the service transmitter.

The status code field indicates the status of service information which is requested. For example, the status of the service information may be defined as illustrated in Table 7.

TABLE 7

| Value | Meaning |
|---|---|
| 0 | Success |
| 1 | Service Protocol Type not available |
| 2 | Requested information not available |
| 3 | Bad Request |
| 4 | Service port not available |
| 5-255 | Reserved |

As disclosed in Table 7, for example, if the value of the status code field is 0, it may indicate that service association between the send transmitter and the send receiver has been successfully performed, but if the value of the status code field is 1 to 4, it may indicate that service association between the send transmitter and the send receiver has been failed.

The TCP port field disclosed in Table 6 indicates a value of the TCP port required for file transfer.

Referring to FIG. 16 again, if the send transmitter transmits the service association request frame, which includes send service meta information on file which will be transmitted, to the send receiver, the send receiver may display information indicating that FTS association has been requested, and may query the user to allow FTS association. If an input as to whether FTS association will be accepted is received from the user, the ASP of the send receiver may respond to the service association request frame. In more detail, the send receiver may transmit the service association response frame, which includes status code, to the send transmitter. If the user accepts FTS association, as disclosed in Table 7, the value of the status code may be set to 0.

If successful FTS association is performed, the send transmitter and the send receiver may perform a P2P group formation process. Through the group formation process, any one of the send transmitter and the send receiver may be set to a group client and the other one may be set to a group owner.

If the P2P group is formed, the send transmitter starts FTS session and file transfer.

FTS session is UPnP session constructed between the peer devices. The send transmitter may search for WFD FTS hosted by the send receiver by using UPnP device architecture.

The send transmitter may use UPnP control point entity to manage a service provided by the WFD FTS hosted by the send receiver. The UPnP control point invokes action(s) provided by the Wi-Fi Direct service to manage file transfer session.

The Wi-Fi Direct file transfer service may use UPnP service as L3 mechanism for management and control of file transfer session. The UPnP service may provide a selective service search procedure for searching for detailed service features supported by the devices. The UPnP service may define UPnP action which will be invoked by the send transmitter, and may allow the send receiver to manage FTS session.

Figure 17:
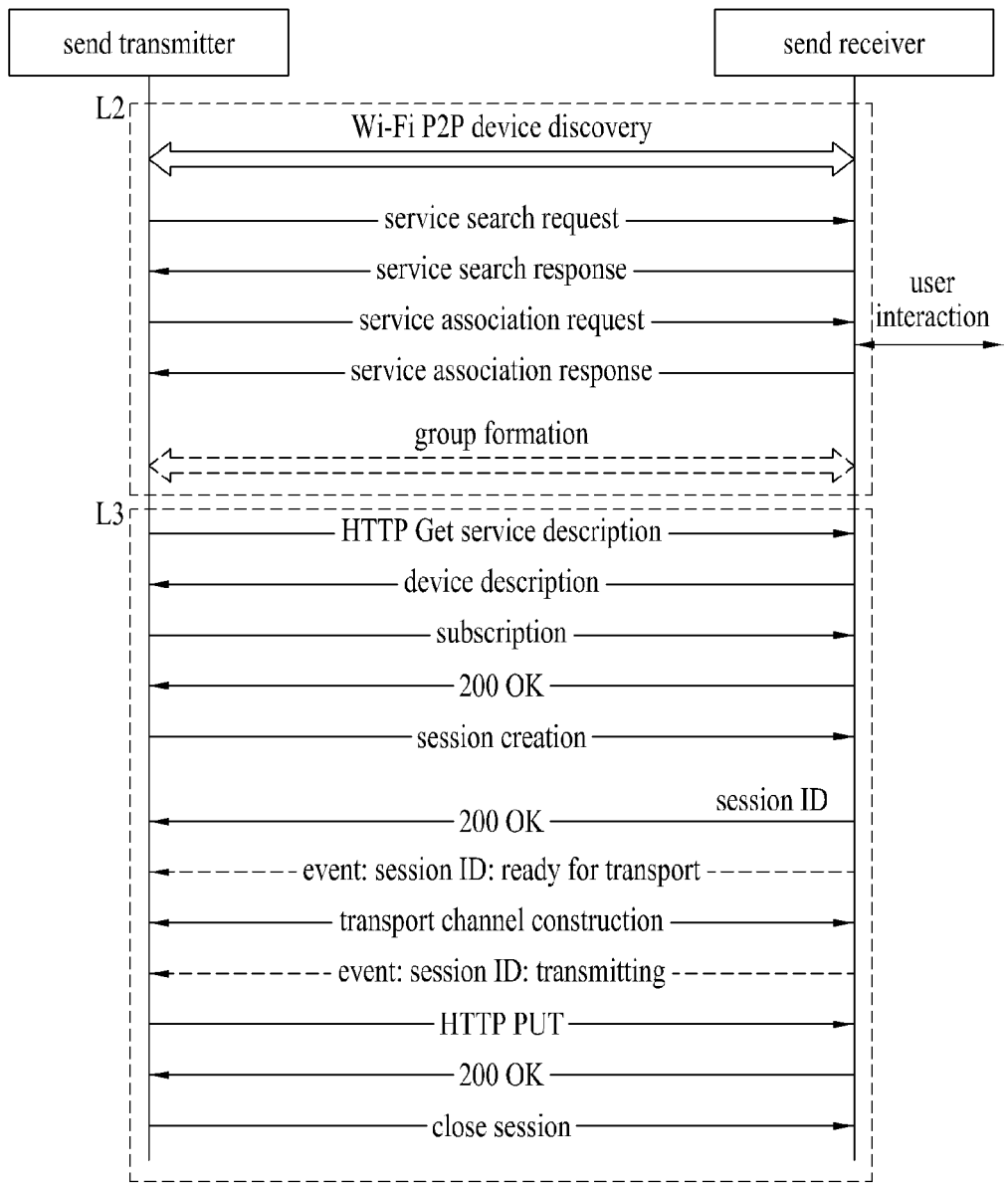
FIG. 17 is a flow chart of FTS session that includes L2 connection and L3 connection.

FIG. 17 is a flow chart of FTS session that includes L2 connection and L3 connection.

Since the procedure of establishing L2 connection has been described with reference to FIG. 16, its detailed description will be omitted.

If successful P2P connection between the send transmitter and the send receiver is made, the send transmitter may retrieve service description document per UPnP device architecture. The UPnP device architecture control point entity may be subscribed to a service (for example, UPnP action(s) on WFDS) hosted by the send receiver.

Afterwards, the send transmitter may invoke session creative action CreateSession that includes its identification information and meta information of file which will be transmitted.

The send receiver that has received session creative action may display information for notifying the user that session creative action has been received. If the user accepts session creation, the send receiver may generate a unique identifier for identifying session and transmit session ID to the send transmitter in response to the session creative action.

Also, the send receiver may transmit transport status variable event Transportstatus variable event, which includes session ID allocated to the generated session and status information of the generated session, to the send transmitter. If the send receiver accepts session creative request, the status of the generated session may be set to ready for transport Ready_for_transport.

The send transmitter that has received the transport status variable event indicating that the generated session is ready for transport may initiate transport channel construction.

Afterwards, if a transport channel is constructed successfully, the send receiver may transmit the transport status variable event by varying the session status to 'transporting'. The send transmitter that has received the transport status variable event indicating that the session status is 'transporting' may transmit file data by using HTTP PUT request.

Formats of Service Search Request Frame and Service Search Response Frame

The service search request frame and the service search response frame, which are used for the service search procedure, may respectively include ANQP (Access Network Query Protocol) query request information and ANQP query response information.

Figures 18, 19, 20:
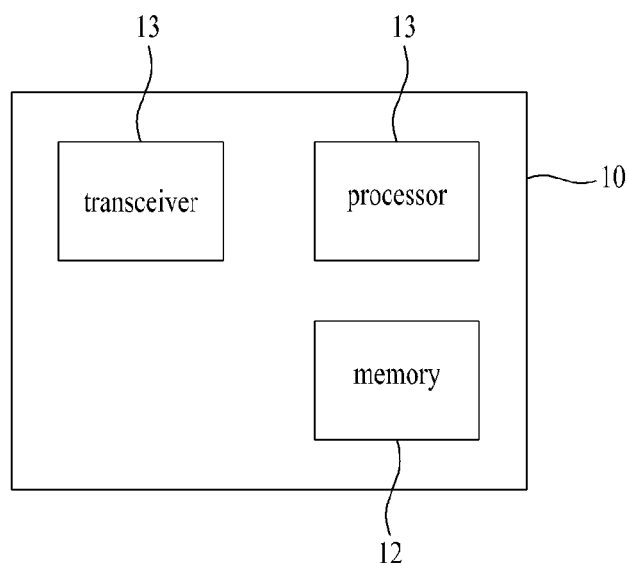
FIGS. 18 and 19 are diagrams respectively illustrating formats of a service search request frame and a service search response frame.
FIG. 20 is a block diagram illustrating a wireless device according to one embodiment of the present invention.

For example, FIGS. 18 and 19 are diagrams respectively illustrating formats of a service search request frame and a service search response frame.

As illustrated in FIG. 18, the service search request frame may further include query data. At this time, the query data may include service information components representative of capability (capabilities) of the send transmitter.

As illustrated in FIG. 19, the service search response frame may include response data. The response frame may include service information. Examples of the service information that may be included in the response data are listed in Table 8.

TABLE 8

| Field | Size (octets) | Value | Description |
| --- | --- | --- | --- |
| Service Protocol Type | 1 | 0x05 | Service protocol types |
| Length | 2 | | Length of the following fields of the subelement |
| Service Info | Variable | | |

Referring to Table 8, the response data may include a service protocol type field, a length field, and a service information field.

The service information field included in the response data may include various kinds of information for FTS. For example, Table 9 is intended to describe fields that may be included in the service information field.

TABLE 9

| Field | Size (octets) | Value | Description |
| --- | --- | --- | --- |
| Service version | 1 | | Service version number |
| UUID | 16 | | UUID of the device |
| Service Status | 1 | | Current status of Send Service |
| Friendly name | | | User friendly name of Send Service devices |
| Session ID | 1 | Valid Service Session ID | Service Session ID of this Send Service |
| Service bitmap | 1 | | Bitmap detailing Service Information |

As disclosed in Table 9, the service information field may include a service version field, an UUID field, a service status field, a friendly name field, a session ID field, and a service bitmap field.

The service version field may indicate version of FTS, which is supported by the send receiver. The UUID (Universally Unique Identifier) field may indicate UUID of the device set to the send receiver.

The service status field indicates the current status of the send service. For example, Table 10 is intended to describe the status of the send service according to the value of the service status field.

TABLE 10

| Value | Description |
|---|---|
| 0 | Ready for transport |
| 1 | Transporting |
| 2 | Wait for user input |
| 3 | Cancelled |
| 4 | Finish |
| 5 | Transporting Paused |
| 6 | Service Session Paused |
| 7 | Service Session Closed |
| 8-253 | Reserved |
| 254 | Unexpected error |

The friendly name field may include text string for allowing the user to easily identify the send service. The send transmitter may allow the user to identify the send receiver, which is a file transport target, by displaying the text string indicated by the friendly name field.

The session ID field indicates session ID allocated for the send service.

The service bitmap field may indicate a type of the device, which uses FTS, and FTS availability of the corresponding device. Table 11 is intended to describe the service bitmap field.

TABLE 11

| Value | Description |
|---|---|
| 0-1 | File Transfer device type<br>10: Send Transmitter<br>01: Send Receiver<br>11: Send Transmitter/Send Receiver<br>00: not Allowed |
| 2 | 0: Not available<br>1: Available |
| 3-7 | Reserved |

As disclosed in Table 11, 2 bits of the service bitmap field may indicate a type of the device that uses FTS. Any one of 2 bits may indicate whether the corresponding device is the send transmitter, and the other one may indicate whether the corresponding device is the send receiver. For example, if the values of 2 bits are all 1, it may indicate that the corresponding device may be operated as the send transmitter and the send receiver. If the values of 2 bits are all 0, it may indicate that the corresponding device is the device that cannot be operated as the send transmitter and the send receiver and cannot support FTS.

1 bit of the service bitmap field may be used to indicate FTS availability of the corresponding device. For example, if FTS is unavailable at the time when the service search response frame is transmitted, the corresponding bit may be set to 0, and if FTS is available at the time when the service search response frame is transmitted, the corresponding bit may be set to 1.

Referring to FIG. 19 again, the service search response frame may include a status code field. If service information indicated by the query data of the service search request frame is not discovered, the status code field may indicate that the requested service information cannot be used by the corresponding device, and a response value may be empty.

Since the status code field has been described in detail with reference to Table 7, its detailed description will be omitted.

Status Attribute

In order to identify a plurality of frames handled by the service advertiser and the service seeker, a status attribute field may be included in the respective frames. In more detail, the status attribute field may be included in a GO negotiation response frame, a GO negotiation confirmation frame, a P2P invitation response frame, a P2P presence response frame, a (re-) association response frame, a provision search request frame, and a provision search response frame.

For example, Table 12 is intended to describe status attributes.

TABLE 12

| Attribute ID | Notes |
|---|---|
| 19 | Seek Service Hash |
| 20 | Service Instance Data Info |
| 21 | Connection capability Info |
| 22 | Advertisement ID Info |
| 23 | Advertised Service Info |
| 24-220 | Reserved |

Seek service hash of the status attributes listed in Table 12 may be used for the probe request frame for retrieving WFDS. The service hash attribute includes a hash array of 6 octet length of service name which should be sought. The format of the service hash attribute is disclosed in Table 13. The hash value may be configured by extracting 6 octet LSB from an output result of SHA-1 on UTF-8 service name.

TABLE 13

| Field | Size | Value | Description |
|---|---|---|---|
| Attribute ID | 1 | 19 | Identifying the type of P2P attribute. |
| Length | 2 | 6 * N | Length of the following filed in the attribute. N represents the number of Service Hash field |
| Service Hash(s) | 6 * N | Variable | Contains N Service Hash values. Each Service Hash is 6 octet array of hash of UTF-8 service name |

As disclosed in Table 13, the probe request frame may include a hash value for a plurality of services. However, even though the hash value for a plurality of services is included in the probe request frame, it is not that information (for example, hash value or advertisement ID for service supported by the service advertiser) on a plurality of services should be included in the probe response frame. It is enough that information of service corresponding to the service supported by the service advertiser among a plurality of hash values included in the probe request frame is only included in the probe response frame.

Service instance data information of the status attributes listed in Table 12 may be included in the provision search request frame. The service instance data information attribute is used to exchange detailed information on suggested instance of service before establishment of connection between the peer devices. The service instance data information attribute is disclosed in Table 14.

TABLE 14

| Field | Size | Value | Description |
|---|---|---|---|
| Attribute ID | 1 | 20 | Identifying the type of P2P attribute |
| Length | 2 | Variable | Length of the following fields in the attribute. Maximum length is 44. |
| Service specific | Variable | Variable | Service specific field provides service specific information |

The service specific field disclosed in Table 14 includes information for the peer device that should determine whether to accept or reject the received service session. The service specific field should be interpreted based on service name.

The connection capable information of the status attributes listed in Table 12 may be included in the provision search request frame and the provision search response frame. The connection capability information attribute includes connection capability of the P2P device. The group owner and the group client of the P2P group may be determined on the basis of the connection capability information attribute. The connection capability information attribute is disclosed in Table 15.

TABLE 15

| Field | Size | Value | Description |
|---|---|---|---|
| Attribute ID | 1 | 21 | Identifying the type of P2P attribute |
| Length | 2 | 1 | Length of the following fields in the attribute |
| Connection Capability | 1 | Variable | |

The connection capability field disclosed in Table 15 may indicate whether the peer device may be set to the group client or the group owner. Table 16 illustrates capability of the peer device, which is based on the value of the connection capability field.

TABLE 16

| Bit | Information | Note |
|---|---|---|
| 0 | New | Set to 1 indicates that the device can be either Client or GO. Otherwise, set to 0. |
| 1 | Client | Set to 1 indicates that the device is a Client or can be Client only. Otherwise, set to 0 |
| 2 | GO | Set to 1 indicates that the device is a GO or can be GO only. Otherwise, set to 0. |
| 3-7 | Reserved | |

As disclosed in Table 16, any one bit of the connection capability field may indicate that the peer device may be set to either the group client or the group owner, and another one bit may indicate that the peer device may be the group client or may be operated as the group client only. The other one bit may indicate that the peer device may be the group owner or may be operated as the group owner only. Table 17 illustrates a masking result based on the values of the three bits which are listed.

TABLE 17

| New | Client | GO (Group Owner) | Resultant Mask |
|---|---|---|---|
| 1 | 0 | 0 | 0x01 |
| 0 | 1 | 0 | 0x02 |

TABLE 17-continued

| New | Client | GO (Group Owner) | Resultant Mask |
|---|---|---|---|
| 0 | 0 | 1 | 0x04 |
| 1 | 0 | 1 | 0x05 |
| 0 | 1 | 1 | 0x06 |

The advertisement ID information attribute of the status attributes listed in Table 12 may be used for the provision search request frame to request ASP session establishment for specific WFDS of the peer device. The advertisement ID information attribute may be used even for the provision search response frame. The advertisement ID information attribute is disclosed in Table 18.

TABLE 18

| Field | Size (Octets) | Value | Description |
|---|---|---|---|
| Attribute ID | 1 | 22 | Identifying the type of P2P attribute. |
| Length | 2 | 2 | Length of the following field in the attribute |
| Advertisement ID | 4 | 0-0xffffffff | U32 value of the advertisement ID on remote peer value |

The advertisement ID included in the advertisement ID information attribute is U32 value of the service discovered during pre-association search, and may be acquired from the service instance attribute.

The advertised service information attribute of the status attributes listed in Table 12 may be used for the probe response frame to identify particular instance of WFDS. The advertised service information attribute may be transmitted in response to the probe request frame that includes hash attribute. The service information attribute is disclosed in Table 19.

TABLE 19

| Field | Size (Octets) | Value | Description |
|---|---|---|---|
| Attribute ID | 1 | 23 | Identifying the type of P2P attribute. |
| Length | 2 | Variable | Length of the following field in the attribute |
| Advertised Service Descriptor(s) | Sum of all Advertised Service Descriptor(s) | — | List of Advertised Service Descriptor(s) |

The format of the advertised service descriptor disclosed in Table 19 is as illustrated in Table 20.

TABLE 20

| Field | Size (Octets) | Value | Description |
|---|---|---|---|
| Advertisement ID | 4 | 0-ffffffff | Advertisement ID of the local service |

As illustrated in Table 20, the advertised service descriptor may include advertisement ID. The service advertiser may transmit the probe response frame, which includes advertisement ID of the service matched with a service hash value, in response to the received probe request frame that includes the service hash value.

Although the exemplary method of the present invention, which is described in the aforementioned embodiments, is expressed as a series of operations for concise description, respective steps of the operations are not intended to limit their order, and may be performed at the same time or in a different order if necessary. Also, it is to be understood that all steps illustrated in the drawings are not required necessarily to realize the method suggested in the present invention.

Also, the method according to the present invention may be implemented in such a manner that the aforementioned various embodiments of the present invention may independently be applied thereto, or two or more embodiments may simultaneously be applied thereto.

FIG. 20 is a block diagram illustrating a wireless device according to one embodiment of the present invention.

The wireless device 10 may include a processor 11, a memory 12, and a transceiver 13. The transceiver 13 may transmit and receive a radio signal, and for example, may implement a physical layer according to the IEEE 802 system. The processor 11 may electrically be connected with the transceiver 13 to implement the physical layer and/or MAC layer according to the IEEE 802 system. Also, the processor 11 may be configured to perform one or more operations of application, service and ASP layers according to the aforementioned various embodiments of the present invention. Also, a module for implementing the operation of the wireless device according to the aforementioned various embodiments of the present invention may be stored in the memory 12, and may be implemented by the processor 11. The memory 12 may be included inside or outside the processor 11, and may be connected with the processor 11 by a well known means.

The detailed configuration of the wireless device of FIG. 20 may be implemented in such a manner that the aforementioned various embodiments of the present invention may independently be applied thereto, or two or more embodiments may simultaneously be applied thereto. The repeated description of the detailed configuration of the wireless device of FIG. 20 will be omitted for clarification.

The embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned embodiments according to the present invention have been described based on the IEEE 802.11 system, the embodiments may equally be applied to various wireless communication systems.

The invention claimed is:

1. A method for searching for service, the method performed in a service seeker device supporting Wi-Fi Direct service, the method comprising:
   transmitting a probe request frame including hash values corresponding to each service of a plurality of services by the service seeker device,
   wherein the hash values are generated by an Application Service Platform (ASP) of the service seeker device based on each service name of a plurality of service names;
   receiving a probe response frame including advertisement identifiers of services matched with the hash values among services supported by a service advertiser device,
   wherein the advertisement identifiers are generated by an Application Service Platform (ASP) of the service advertiser device;
   transmitting a service search request frame including service names of available services among services corresponding to the advertisement identifiers included in the probe response frame to the service advertiser device;
   receiving a service search response frame from the service advertiser device,
   wherein the service search response frame includes service status information indicating availability of each of services corresponding to service names included in the search request frame on the service advertiser device; and
   establishing each of sessions corresponding to services available on the service advertiser device based on an Application Service Platform (ASP),
   wherein a further service search response frame is received when the service advertiser device calls a service status change method indicating that availability of at least one service is changed,
   wherein the further service search response frame includes service status information indicating the changed availability of each of services on the service advertiser device, and
   wherein the ASP is a platform used between the service seeker device and the service advertiser device for the service search.

2. The method according to claim 1, further comprising transmitting a service association request frame requesting service association from the service seeker device to the service advertiser device when at least one matched service is available on the service advertiser device.

3. The method according to claim 2, wherein the service advertiser device determines whether to wait for acceptance of a user in performing service association depending on whether the service advertiser device has been set to automatically accept a service request of the service seeker device.

4. The method according to claim 1, wherein the probe response frame includes at least one of a service information indicating field indicating whether service information on at least one matched service exists, or service status field indicating whether at least one matched service is available on the service advertiser device when the probe response frame is transmitted.

5. The method according to claim 1, further comprising generating a search result event for allowing the service seeker device to report a search result of at least one matched service, wherein the search result event includes a service status parameter indicating whether at least one matched service is available on the service advertiser device.

6. A method for advertising service, the method performed in a service advertiser device supporting Wi-Fi Direct service, the method comprising:
receiving a probe request frame including hash values corresponding to each service of a plurality of services by the service advertiser device,
wherein the hash values are generated by an Application Service Platform (ASP) of a service seeker device based on each service name of a plurality of service names;
transmitting a probe response frame including advertisement identifiers of services matched with the hash values among services supported by the service advertiser device,
wherein the advertisement identifiers are generated by an Application Service Platform (ASP) of the service advertiser device;
receiving a service search request frame including service names of available services among services corresponding to the advertisement identifiers included in the probe response frame from the service seeker device;
transmitting a service search response frame to the service seeker device,
wherein the service search response frame includes service status information indicating availability of each of services corresponding to service names included in the search request frame on the service advertiser device; and
establishing each of sessions corresponding to services available on the service advertiser device based on an Application Service Platform (ASP),
wherein a further service search response frame is received when the service advertiser device calls a service status change method indicating that availability of at least one service is changed,
wherein the further service search response frame includes service status information indicating the changed availability of each of services on the service advertiser device, and
wherein the ASP is a platform used between the service seeker device and the service advertiser device for the service search.

7. A service seeker device supporting Wi-Fi Direct service and searching for service, the service seeker device comprising:
a transceiver; and
a processor,
wherein the processor is configured to control the transceiver,
wherein the processor is further configured to:
control the transceiver to transmit a probe request frame including hash values corresponding to each service of a plurality of services by the service seeker device,
wherein the hash values are generated by an Application Service Platform (ASP) of the service seeker device based on each service name of a plurality of service names,
control the transceiver to receive a probe response frame including advertisement identifiers of services matched with the hash values among services supported by a service advertiser device,
wherein the advertisement identifiers are generated by an Application Service Platform (ASP) of the service advertiser device,
control the transceiver to transmit a service search request frame including service names of available services among services corresponding to the advertisement identifiers included in the probe response frame to the service advertiser device; and
control the transceiver to receive a service search response frame from the service advertiser device in response to the service search request frame,
wherein the service search response frame includes service status information indicating availability of each of services corresponding to service names included in the search request frame is on the service advertiser device, and
establish each of sessions corresponding to services available on the service advertiser device based on an Application Service Platform (ASP),
wherein a further service search response frame is received when the service advertiser device calls a service status change method indicating that availability of at least one service is changed,
wherein the further service search response frame includes service status information indicating the changed availability of each of services on the service advertiser device, and
wherein the ASP is a platform used between the service seeker device and the service advertiser device for the service search.

8. A service advertiser device supporting Wi-Fi Direct service, the service advertiser device comprising:
a transceiver; and
a processor,
wherein the processor is configured to control the transceiver,
wherein the processor is further configured to:
control the transceiver to receive a probe request frame including hash values corresponding to each service of a plurality of services from a service seeker device,
wherein hash values are generated by an Application Service Platform (ASP) of the service seeker device based on each service name of a plurality of service names,
control the transceiver to transmit a probe response frame including advertisement identifiers of services matched with the hash values among services supported by the service advertiser device,
wherein the advertisement identifiers are generated by an Application Service Platform (ASP) of the service advertiser device,
control the transceiver to receive a service search request frame including service names of available services among services corresponding to the advertisement identifiers included in the probe response frame from the service seeker device,
control the transceiver to transmit a service search response frame to the service seeker device, wherein the service search response frame includes a plurality of service status information indicating availability of each of services corresponding to service names included in the search request frame on the service advertiser device, and establish each of sessions corresponding to services available on the service advertiser device based on an Application Service Platform (ASP), wherein a further service search response frame is received when the service advertiser device calls a service status change method indicating that availability of at least one service is changed, wherein the further service search response frame includes service status information indicating the changed availability of each of services on the service advertiser device, and wherein the ASP is a platform used between the service seeker device and the service advertiser device for the service search.

* * * * *